(12) United States Patent
Cho et al.

(10) Patent No.: US 10,185,492 B2
(45) Date of Patent: Jan. 22, 2019

(54) MOBILE TERMINAL AND METHOD FOR CONTROLLING THE SAME

(71) Applicant: LG ELECTRONICS INC., Seoul (KR)

(72) Inventors: Seonhwi Cho, Seoul (KR); Donghoe Kim, Seoul (KR); Wanho Ju, Seoul (KR); Sungchae Na, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 246 days.

(21) Appl. No.: 15/197,916

(22) Filed: Jun. 30, 2016

(65) Prior Publication Data

US 2017/0083226 A1    Mar. 23, 2017

(30) Foreign Application Priority Data

Sep. 23, 2015    (KR) ........................ 10-2015-0134879

(51) Int. Cl.
     G06F 3/0488      (2013.01)
     G06F 3/0482      (2013.01)
     G06F 3/0486      (2013.01)
     G06F 3/0484      (2013.01)

(52) U.S. Cl.
     CPC ........ G06F 3/04883 (2013.01); G06F 3/0482 (2013.01); G06F 3/0486 (2013.01); G06F 3/04842 (2013.01)

(58) Field of Classification Search
     CPC .... G06F 3/0488; G06F 3/0481; G06F 3/0482; G06F 3/0486
     See application file for complete search history.

(56) References Cited

U.S. PATENT DOCUMENTS

| | | | | |
|---|---|---|---|---|
| 2010/0281409 | A1* | 11/2010 | Rainisto | ................. G06F 9/451 |
| | | | | 715/767 |
| 2013/0159417 | A1* | 6/2013 | Meckler | ................. H04L 67/22 |
| | | | | 709/204 |
| 2014/0118272 | A1 | 5/2014 | Gunn | |
| 2015/0007075 | A1 | 1/2015 | Choi et al. | |

(Continued)

FOREIGN PATENT DOCUMENTS

KR    10-2015-0084579      7/2015

OTHER PUBLICATIONS

International Search Report dated Oct. 25, 2016 issued in Application No. PCT/KR2016/007168.

*Primary Examiner* — David E Choi

(74) *Attorney, Agent, or Firm* — KED & Associates, LLP

(57) ABSTRACT

A mobile terminal and a method for controlling the same that may be used considering more convenience of users are disclosed. The mobile terminal comprises a wireless communication unit; a touch screen; and a controller controlling the touch screen to output at least a part of a first notification panel configured to output notification information based on a drag touch input applied to one area of the touch screen, wherein the controller outputs at least a part of a second notification panel different from the first notification panel based on a touch applied to one area of the first notification panel in a state that at least a part of the first notification panel has been output, and notification information of an application of which notification mode is set to a specific mode is displayed on the second notification panel.

20 Claims, 20 Drawing Sheets

(56) References Cited

U.S. PATENT DOCUMENTS

| | | |
|---|---|---|
| 2015/0134755 A1 | 5/2015 | Park |
| 2015/0177970 A1 | 6/2015 | Choi |
| 2016/0062590 A1* | 3/2016 | Karunamuni ......... G06F 3/0488 715/863 |
| 2016/0132192 A1* | 5/2016 | Sutton ................... G06F 3/0482 715/719 |
| 2016/0227055 A1* | 8/2016 | Ishino ................ H04N 1/00411 |
| 2017/0083226 A1* | 3/2017 | Cho .................... G06F 3/04883 |

* cited by examiner

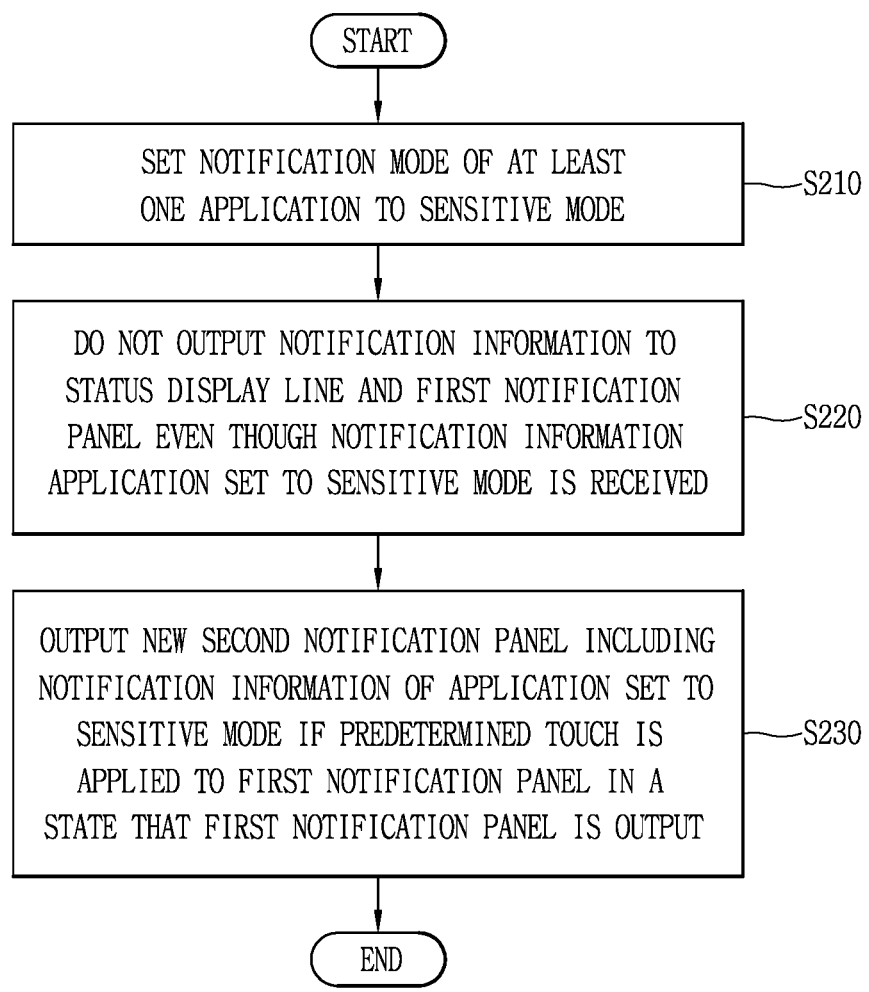

MOBILE TERMINAL AND METHOD FOR CONTROLLING THE SAME

CROSS-REFERENCE TO RELATED APPLICATION(S)

Pursuant to 35 U.S.C. § 119(a), this application claims the benefit of earlier filing date and right of priority to Korean Application No. 10-2015-0134879, filed on Sep. 23, 2015, the contents of which is incorporated by reference herein in its entirety.

BACKGROUND

1. Field

The present invention relates to a mobile terminal and a method for controlling the same that may be used considering more convenience of users.

2. Background

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components.

Since various applications have been recently developed, a mobile terminal may perform various functions. With the development of such applications, users can install various kinds of applications in a mobile terminal and receive notification information provided by applications.

However, since notification information provided by applications are conventionally output by a mobile terminal in real time, periodically or whenever notification information is transmitted from an external server providing applications, problems occur in that notification information is output at the time when users do not desire to receive or notification information of applications, which are not desired by users, is output.

Also, in order that users do not receive notification information of applications that they do not desire, it would be inconvenience for users to set the applications one by one to block output of notification information, and in the case where notification information is generated by an application set to block notification information, a problem occurs in that users cannot output or receive notification information of the corresponding application later.

SUMMARY OF THE INVENTION

Therefore, an object of the present invention is to provide a mobile terminal and a method for controlling the same that optimally outputs notification information generated by an application.

Another object of the present invention is to provide a mobile terminal and a method for controlling the same that outputs notification information of an application at a user's desired time.

To achieve these and other advantages and in accordance with the purpose of the invention, as embodied and broadly described herein, according to one embodiment of the present invention, a mobile terminal comprises a wireless communication unit; a touch screen; and a controller controlling the touch screen to output at least a part of a first notification panel configured to output notification information based on a drag touch input applied to one area of the touch screen, wherein the controller outputs at least a part of a second notification panel different from the first notification panel based on a touch applied to one area of the first notification panel in a state that at least a part of the first notification panel has been output, and notification information of an application of which notification mode is set to a specific mode is displayed on the second notification panel.

According to the embodiment, the one area of the touch screen is a status display line, and the one area of the first notification panel is an area adjacent to one edge of the first notification panel.

According to the embodiment, the controller, if a drag touch is applied to the one area of the first notification panel in one direction, outputs the second notification panel to the touch screen based on the drag touch.

According to the embodiment, the controller, if a touch is applied to the one area of the first notification panel, outputs icons of at least one application of which notification mode is set to the specific mode, to the one area and outputs the second notification panel including notification information of the application corresponding to the one icon to the touch screen based on the drag touch starting from one of the icons and applied in one direction.

According to the embodiment, the first notification panel includes a specific area displaying notification information, and the controller, if a drag touch is applied to the specific area in an opposite direction from the one direction in a state that notification information corresponding to the last order has been displayed on the specific area, outputs the second notification panel to the touch screen.

According to the embodiment, the controller, if a drag touch is applied with a first distance in the opposite direction in a state that the notification information corresponding to the last order has been displayed, outputs a graphic image indicating that a scroll using the drag touch on the specific area is not allowed, to the specific area, displays icons of an application of which notification mode is set to the specific mode on the graphic image when the drag touch is applied with a second distance longer than the first distance, and outputs the second notification panel including notification information of an application set to the specific mode to the touch screen when the drag touch is applied with a third distance longer than the second distance.

According to the embodiment, the part of the first notification panel is output to the one area of the touch screen if a touch is applied to the one area of the touch screen, the part of the first notification panel is changed to the part of the second notification panel when a touch including a predetermined pattern is applied continuously to the applied touch in a state that the part of the first notification panel has been output, and the controller outputs the second notification panel to the touch screen based on the drag touch applied in one direction continuously to the touch including the pattern.

According to the embodiment, the controller outputs the second notification panel instead of the first notification panel to the touch screen when a drag touch starting from at least two points is applied to the one area of the touch screen.

According to the embodiment, the controller groups a plurality of applications of which notification mode is set to the specific mode, into at least two groups based on a user's request, displays graphic objects related to at least the two groups if a touch is applied to the one area of the first notification panel in a state that at least the two groups are set, and displays the second notification panel displaying notification information of applications included in a group corresponding to one of the graphic objects if a touch is applied to the one of the graphic objects.

According to the embodiment, the part of the first notification panel is output to the one area of the touch screen if a touch is applied to the one area of the touch screen, and the controller changes the part of the first notification panel into the graphic objects related to at least the two groups if a touch including a pattern is applied continuously to the applied touch in a state that at least the two groups have been set and outputs the second notification panel displaying notification information of applications included in the group corresponding to one of the graphic objects based on a drag touch starting from the one of the graphic objects.

According to the embodiment, the controller outputs a third notification panel displaying notification information of applications included in the other group different from the group corresponding to the one graphic object, to the touch screen if a drag touch is applied to the second notification panel in one direction in a state that the second notification panel has been output.

According to the embodiment, the controller outputs the third notification panel displaying notification information of applications included in the other group different from the group corresponding to the one graphic object, to the touch screen if a drag touch starting from notification information displayed on the second notification panel reaches one side of the second notification panel and displays the notification information to which the drag touch is applied, on the third notification panel if the drag touch is released from the third notification panel.

According to the embodiment, the controller sets applications associated with the notification information to which the drag touch is applied, to the other group.

According to the embodiment, the controller changes the first notification panel to the second notification panel if a drag touch starting from notification information displayed on the first notification panel reaches one side of the first notification panel and displays notification information to which the drag touch is applied, on the second notification panel if the drag touch is released from the second notification panel.

According to the embodiment, the controller sets a notification mode of applications associated with notification information to which the drag touch is applied, to the specific mode.

In another aspect of the present invention, a method for controlling a mobile terminal comprises the steps of outputting at least a part of a first notification panel configured to output notification information based on a drag touch input applied to one area of a touch screen; and outputting at least a part of a second notification panel including notification information of applications of which notification mode is set to a specific mode, based on a touch applied to one area of the first notification panel in a state that at least the part of the first notification panel has been output, the second notification panel being different from the first notification panel.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

The above references are incorporated by reference herein where appropriate for appropriate teachings of additional or alternative details, features and/or technical background.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIG. 2 is a flow chart illustrating an exemplary method for controlling a mobile terminal according to the present invention;

DETAILED DESCRIPTION

Figure 1A:
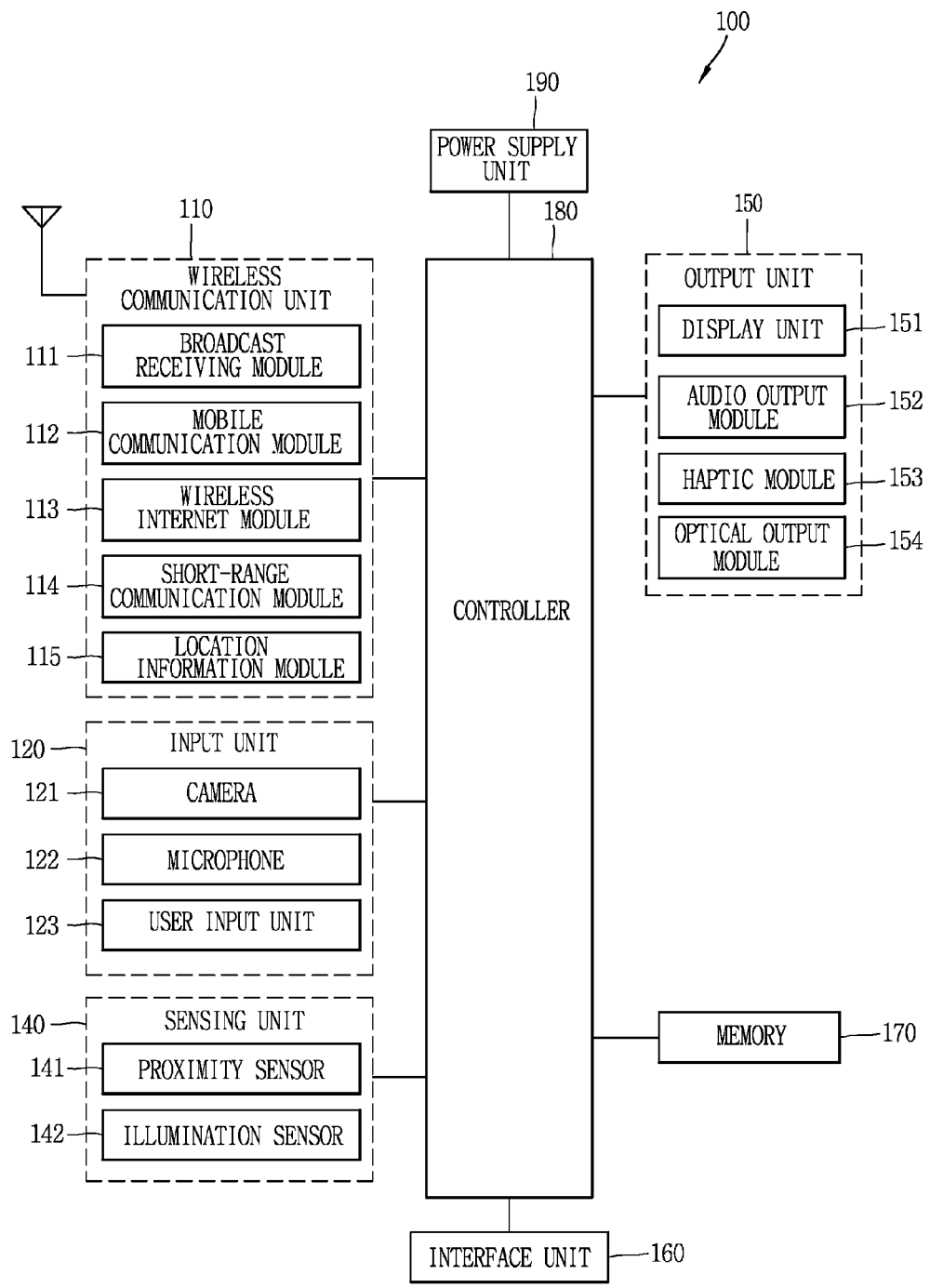
FIG. 1a is a block diagram illustrating a mobile terminal according to the present invention.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
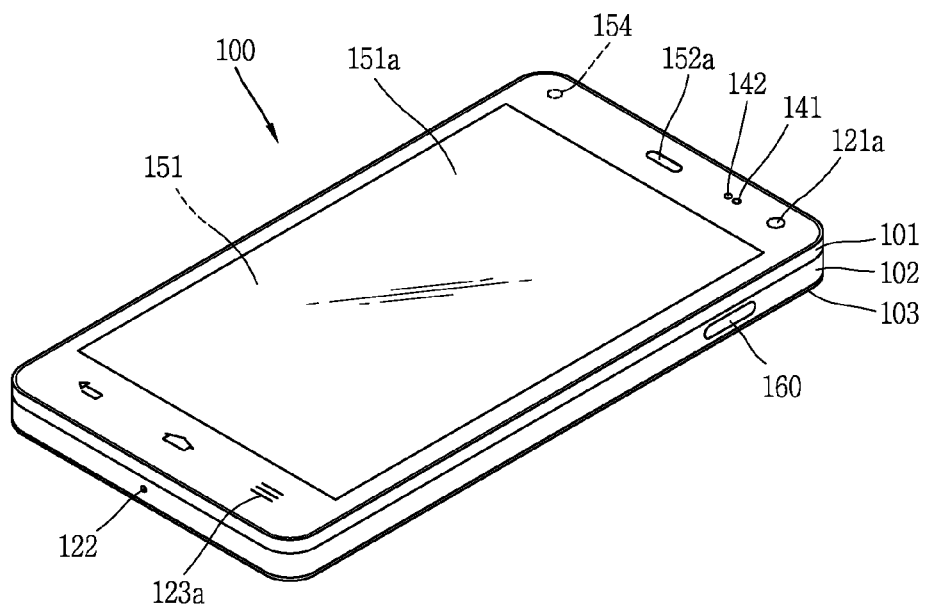
FIGS. 1b and 1c are conceptual views illustrating an example of a mobile terminal according to the present invention, which is viewed from different directions.
Figure 1C:
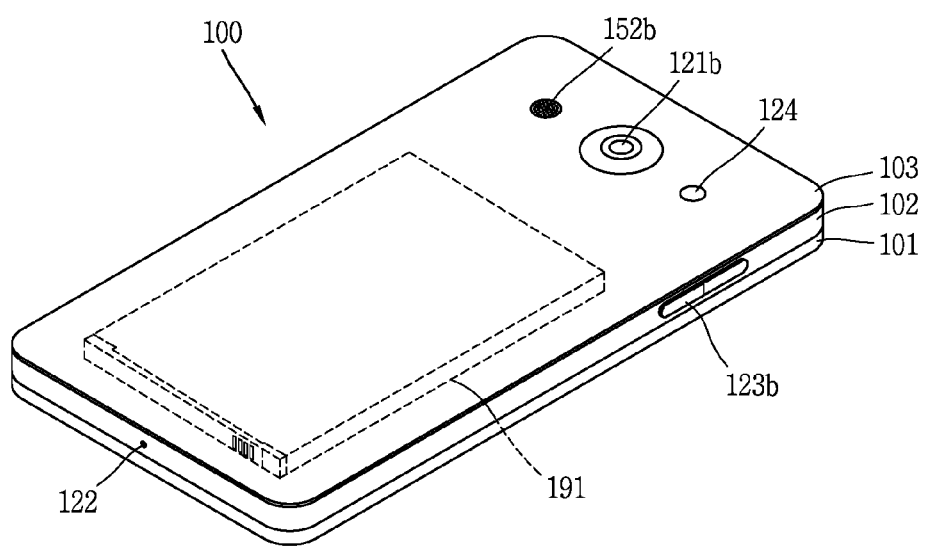

Reference is now made to FIGS. 1A to 1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 121, which is one type of audio input device for inputting an audio signal, and a user input unit 122 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 121, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 122 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1, or activating application programs stored in the memory 170. As one example, the controller 180 controls some or all of the components illustrated in FIG. 1 according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the above components may operate in a cooperating manner, so as to implement an operation or a control method for a glass type terminal according to various embodiments to be explained later. The operation or the control method for the glass type terminal may be implemented on the glass type terminal by driving at least one application program stored in the memory 170.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121*b* is implemented as an array camera, images may be captured in various manners using the plurality of lenses and images with better qualities.

As shown in FIG. 1C, a flash 124 is shown adjacent to the second camera 121*b*. When an image of a subject is captured with the camera 121*b*, the flash 124 may illuminate the subject.

As shown in FIG. 1B, the second audio output module 152*b* can be located on the terminal body. The second audio output module 152*b* may implement stereophonic sound functions in conjunction with the first audio output module 152*a*, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

The mobile terminal 100 according to the present invention which may include at least one of the aforementioned elements may output notification information (hereafter, referred to as 'notification information of an application') generated by an application.

Figure 4:
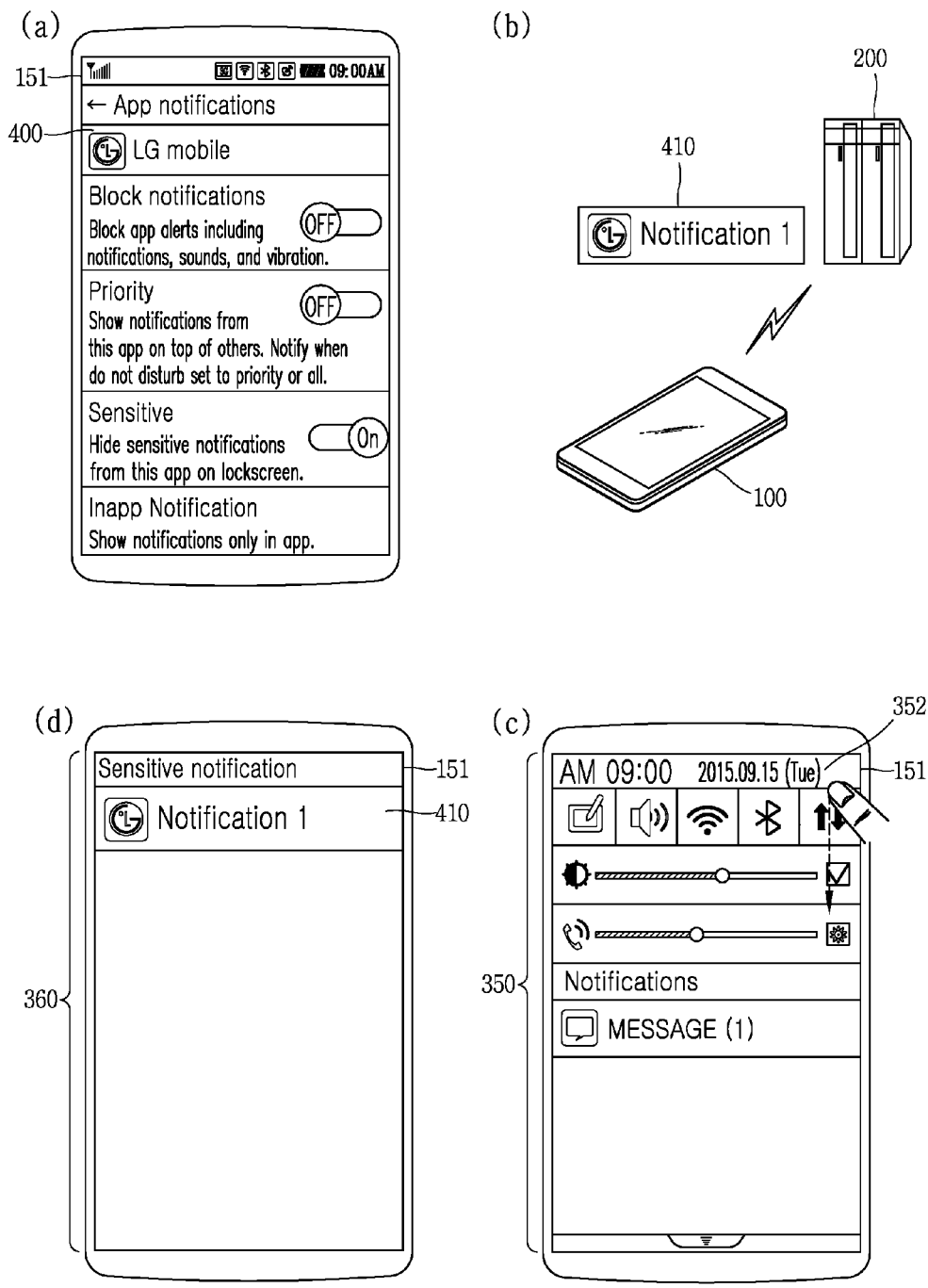

The notification information of the application means notification information related to the application, may be output (generated) by the application installed in the mobile terminal periodically or every predetermined time, and may be output whenever notification information (or event information) is received through the wireless communication unit 110 from an external server 200 (see (b) of FIG. 4) that transmits data (information) to the application.

The notification information, for example, may be output to a touch screen 151. Also, if the notification information is generated, the controller 180 may output a notification sound indicating that the notification information has been generated, through the audio output module 152, or may generate a vibration to indicate that notification information has been generated, by controlling the haptic module 153. Also, if the notification information is generated, the controller 180 may emit light through an optical output module 154 to indicate that the notification information has been generated.

At least one of type of the notification sound, vibration intensity (or pattern), or color of the light may be varied depending on a type of the application generating the notification information or a type of the notification information.

The notification information may include various kinds of information. For example, notification information output (generated) by a messenger related application may include message (or contents), event information, etc., which are transmitted from other mobile terminal (or external server).

For another example, notification information output by applications related to music, stock, and game may include event related information received from the external server, which transmits data (information) to each application, and information corresponding with a condition set by a user.

In addition, the notification information of applications may include various kinds of information that can be generated by each application.

The aforementioned notification information of applications may be output to the touch screen 151 in various ways under the control of the controller 180.

Hereafter, for convenience of description, the case where notification information of an application is received from an external server through a wireless communication unit 110 will be described exemplarily. However, without limitation to the above case, following descriptions may equally/similarly be applied to the case where notification information is generated by an application on its own.

If notification information of an application is received through the wireless communication unit 110, the controller 180 may control the audio output module 152, the haptic module 153, or the optical output module 154 to indicate that the notification information has been received.

Figure 3A:
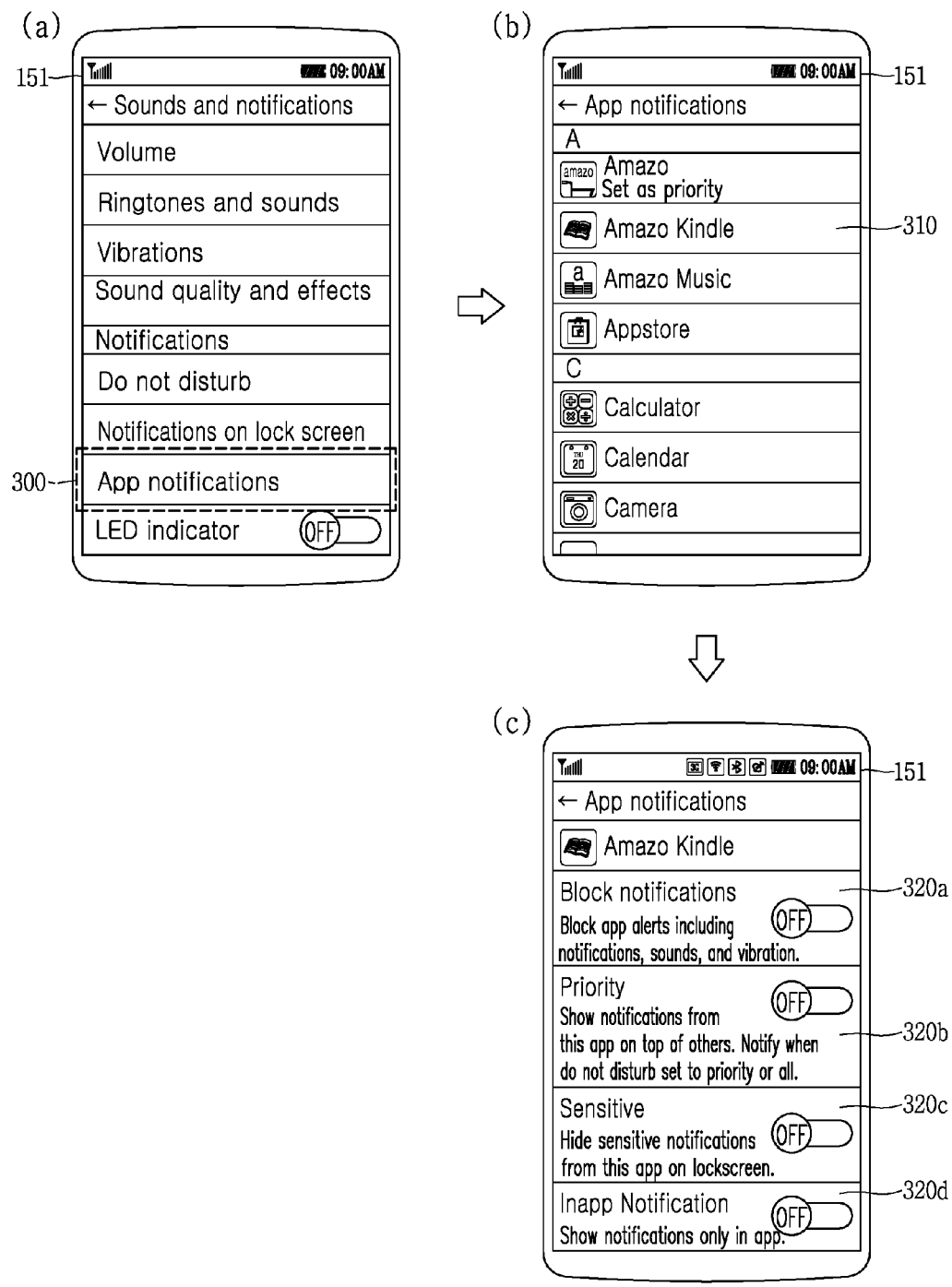
FIGS. 3a, 3b, and 4 are conceptual views illustrating a method for controlling a mobile terminal, described in FIG. 2.
Figure 3B:
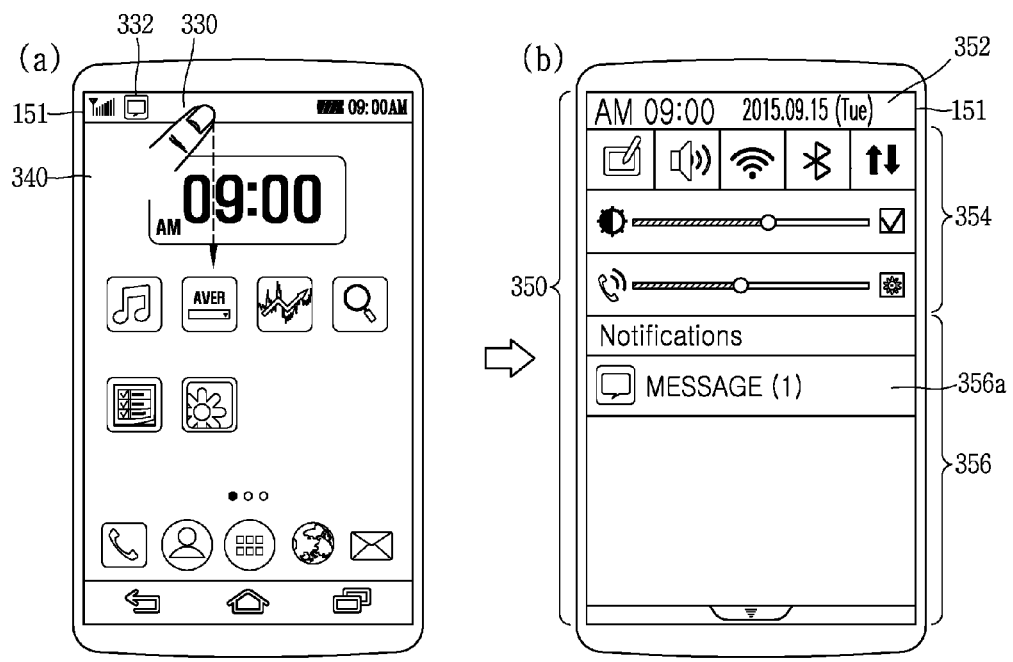

Also, if notification information of an application is received through the wireless communication unit 110, the controller 180 may display an indicator 332 on a status display line 330 to indicate that the notification information has been received (see FIG. 3*b*).

The status display line 330 may be referred to as a status display bar or a status bar, etc. Various kinds of information may be output to the status display line 330. For example, an indicator indicating signal intensity of a mobile communication network connected (or detected) through the wireless communication unit 110, time information, an indicator indicating usable battery power of a power supply unit, and an indicator 332 indicating that notification information has been received, etc. may be displayed on the status display line 330.

The status display line 330 may not be output to the touch screen 151 due to a running screen of an application. In this case, the controller 180 may output the status display line 330 to the touch screen 151 based on a predetermined touch (for example, drag touch input or short touch, etc.) applied to an edge of the touch screen 151.

The indicator 332 may have a shape corresponding a shape of an icon of an application generating notification information or may be an image (or icon, graphic object) which is set separately.

Also, if notification information of an application is received through the wireless communication unit 110, the controller 180 may display notification information (or notification bar 356*a*) on a notification panel 350.

The notification panel 350 may variously be referred to as a curtain window, a quick panel, a status panel, a system user interface, or the like.

The notification panel 350 may be output to the touch screen 151 in various manners. For example, the controller 180, as shown in (a) in FIG. 3b, may generate at least a part of the notification panel 350 to the touch screen 151, based on a drag touch input applied to one area of the touch screen 151. The one area, for example, may be the status display line 330.

The notification panel 350 depends on a distance to which the drag touch input (or drag touch) is applied, and at least a part of the notification panel 350 may be output to the touch screen 151. In more detail, the controller 180 depends on proceeding of a drag touch starting from the status display line 330 in one direction (for example, downward direction) and may magnify an output size of the notification panel 350 output to the touch screen 151.

The controller 180 may output the entire notification panel 350 to the touch screen 151 based on whether the drag touch applied to the one area (or the status display line 330) satisfies a predetermined condition.

For example, in the case where the drag touch is applied with a faster speed than a predetermined speed, the controller 180 may output the entire notification panel 350 to the touch screen 151.

For another example, the controller 180 may output the entire notification panel 350 to the touch screen 151 if the drag touch is applied with a distance longer than a reference distance and then released. If the drag touch is applied with a distance less than a reference distance and then released, a part of the output notification panel 350 dependent on the drag touch may disappear from the touch screen 151.

The notification panel 350 output to the touch screen 151 may disappear from the touch screen 151 based on the drag touch (or drag touch input) applied in an opposite direction (for example, upward direction) to the one direction.

Various kinds of information, images, and function buttons may be displayed on the notification panel 350.

For example, referring to (b) of FIG. 3b, the start and weather information may be displayed on a first area 352 of the notification panel 350.

Also, graphic objects related to feasible functions in the mobile terminal may be displayed on a second area 354 of the notification panel 350. Based on a touch applied to the graphic objects, the controller 180 may operate a function (or module) related to the graphic object to which a touch is applied, or may enable (or on) or disable (or off) the function. Also, if a touch on the graphic object is maintained longer than the reference time, the controller 180 may output a setup screen corresponding to a function associated with the corresponding graphic object to the touch screen 151.

The graphic object may be referred to as a quick button and a quick icon, etc., for example.

As described above, the notification panel 350 may be made to enable the output of the notification information. For example, the notification information (or notification bar 356a) may be displayed on a third area 356 of the notification panel 350.

The notification information displayed on the third area 356 of the notification panel 350 may mean notification information itself received through the wireless communication unit 110, and may include at least a part of contents included in the received notification information and an icon image of an application receiving the notification information in order to indicate that the notification information has been received through the wireless communication unit 110.

If the notification information displayed on the notification panel 350 is selected, the controller 180 may run an application corresponding to (or associated with) the selected notification information. Also, the controller 180 may output a running screen associated with the notification information among running screens of the application to the touch screen 151.

If a predetermined touch (for example, drag touch applied to the right side or left side) is applied to the notification information displayed on the notification panel 350, the controller 180 may make the notification information, to which the predetermined touch is applied, disappear from the notification panel 350.

The notification panel 350 described above will be referred to as 'a first notification panel 350', hereinafter.

Meanwhile, even if notification information of an application is received, the mobile terminal 100 according to the present invention may not display the notification information on the status display line or the first notification panel and may provide a user interface that can output notification information at a user's desired time. Hereinafter, a method for outputting notification information at a user's desired time will be described in more detail with reference to the accompanying drawings.

FIG. 2 is a flow chart illustrating an exemplary method for controlling a mobile terminal according to the present invention and FIGS. 3a, 3b, and 4 are conceptual views illustrating a method for controlling a mobile terminal, described in FIG. 2.

Referring to FIG. 2, in the present invention, a notification mode of at least one application is set to a sensitive mode (S120).

In more detail, the controller 180 may set at least one notification mode of applications, which are previously installed, to a sensitive mode (specific mode) based on a request of a user.

Hereinafter, a sensitive mode (specific mode) which will be mentioned in this specification will be described in more detail.

The sensitive mode according to the present invention may be understood as a concept including (comprising) various modes related to notification method.

For example, when notification information of an application is received, a first mode of the sensitive mode may be a mode that does not display content of the notification information on a lock screen but displays only an icon of the application in which the notification information is received to indicate that the notification information has been received.

For another example, if notification information of an application is received, a second mode of the sensitive mode may be a mode, which displays neither a content of the notification information nor an icon of an application indicating that the notification information has been received, on the lock screen.

For still another example, if notification information of an application is received, a third mode of the sensitive mode may be a mode that displays neither a content of the notification information nor an icon of the application on all screens as well as the lock screen.

Hereinafter, the case where a sensitive model is the third mode described above will be described as an example for convenience of description.

Meanwhile, an opposite concept of the sensitive mode is defined as 'a normal mode' in this specification. The normal mode may be understood as a mode enabling an output of a content of notification information or an icon of an application indicating that notification information has been received all screens as well as on the lock screen, when the notification information of the application is received.

Also, the sensitive mode is used to refer to 'the specific mode' in this specification. That is, the specific mode described in this specification may mean the sensitive mode.

In FIG. 3a, an example of setting a notification mode of an application to a specific mode (sensitive mode) is illustrated. As illustrated in (a) of FIG. 3a, if an option 300 related to the notification mode is selected from a setup menu, the controller 180 may display a list of applications that can change the notification mode (or applications installed in a memory 170), as illustrated in (b) of FIG. 3a.

If an application option 310 is selected from the list, the controller 180 may output a screen that enables a setup of the notification mode, to the touch screen 151.

A notification mode of an application may include various modes including the aforementioned specific mode (sensitive mode).

For example, a block mode 320a may be a mode which is set so as not to receive notification information of an application.

For another example, a priority mode 320b, if notification information of an application is received, may be a mode that displays the received notification information of the application with priority even though notification information of another application has been displayed. In this case, displaying the notification information with priority may mean outputting the notification information as a first order from an area where an output of notification information included in the notification panel is feasible, for example.

A description of a sensitive mode 320c will be replaced with the description of the aforementioned sensitive mode.

For still another example, an InApp mode 320d may be a mode for outputting notification information of an application only if the application has been run (or in a state that a running screen of the corresponding application has been output). The details related to the InApp mode will be described in more detail with reference to FIGS. 10a to 10d.

In addition, the notification mode according to the present invention may be changed/modified by user settings in various ways.

Referring to FIG. 2 again, in the present invention, even if notification information of an application set to a specific mode (sensitive mode) is received, a step for not outputting the received notification information to the status display line and the first notification panel is performed (S220).

As described above, the specific mode (sensitive mode) according to the present invention, if notification information of an application is received, may be a mode that displays neither contents of the notification information nor icons of the application on all screens as well as the lock screen.

If the notification information of the application is received through the wireless communication unit 110 in a state that a notification mode of the application is set to a specific mode (sensitive mode), the controller 180 may not output the notification information of the application to the first notification panel. Also, the controller 180, even if the notification information of the application is received, may not output an indicator indicating that the notification information of the application has been received, to the status display line. The notification information that has not been output may be stored (or temporarily stored) in the memory 170.

Meanwhile, in the case where a notification mode of an application is set to a normal mode not a specific mode (sensitive mode), if notification information of the application is received, the controller 180 may display an indicator 332 indicating that the notification information has been received, on the status display line 330, as illustrated in (a) of FIG. 3b.

If a drag touch input (or drag touch) starting from the status display line 330 is applied, the controller 180 may output at least a part of the first notification panel 350 to the touch screen 151. At this time, the received notification information 356a of the application may be displayed on the area 356 where the output of the notification information of the first notification panel 350 is feasible.

Referring to FIG. 2 again, in the present invention, in a state that notification information of an application of which notification mode is set to a specific mode (sensitive mode) has not been output to the first notification panel (that is, in a state that the first notification panel has been output to the touch screen 151), if a touch (or a predetermined touch) is applied to the first notification panel, a step of outputting a new second notification panel including notification of an application of which notification mode is set to a specific mode (sensitive mode) is performed (S230).

In more detail, at least a part of the first notification panel may be output to the touch screen 151 based on a drag touch input starting from the status display line. At this time, the notification information of the application of which notification mode is set to a specific model (sensitive mode) may not be displayed on the first notification panel.

In a state that the first notification panel has been output, at least a part of the second notification panel different from the first notification panel may be output to the touch screen 151 based on a predetermined touch applied to an area of the first notification panel. Also, the notification information of the application of which notification mode is set to a specific mode (sensitive mode) may be displayed on the second notification panel.

The second notification panel may be output in the same as/similar to the first notification panel.

For example, if a touch (or a predetermined touch, for example, drag touch) is applied to one area of the first notification panel, the controller 180 may output at least a part of the second notification panel different from the first notification panel to the touch screen 151. The area of the first notification panel may be an area adjacent to an edge of the first notification panel (for example, the first area 352 illustrated in (b) of FIG. 3b).

Also, the predetermined touch may be a drag touch applied in one direction on one area of the first notification panel, for example. The details related to a drag touch for outputting the second notification panel may equally/similarly be applied to the aforementioned details of the drag touch for outputting the first notification panel.

For example, if a drag touch is applied in one direction (for example, downward direction) on one area of the first notification panel, the controller 180 may be dependent on the drag touch and then output at least a part of the second notification panel to the touch screen 151.

However, without limitation to the above description, the predetermined touch may include various types of touches. The predetermined touch applied to one area of the first notification panel to output the second notification panel, for example, may include a short (or tap) touch, a long touch, a double touch, a multi touch, a drag touch, a flick touch, a pinch-in-touch, a pinch-out touch, a swipe touch, and a hovering touch, etc.

Hereinafter, the predetermined touch will be described in more detail. The short (or tap) touch may be a touch which is released within a certain time after a touch target (for example, finger or stylus pen) touches the touch screen 151 (after a touch is applied to the touch screen). For example, the short (or tap) touch may be a touch, where a touch target touches the touch screen 151 for a short time, such as a single click of a mouse.

The long touch may be a touch which is maintained for a certain time or more after a touch target touches the touch screen 151. For example, the long touch may be a touch which is maintained for a certain time or more after the touch screen 151 is touched by a touch target. In more detail, the long touch may be a touch released after the touch is maintained at one point on the touch screen for a certain time or more. Also, the long touch may be understood as a touch corresponding to a touch and hold operation that maintains a touch state of a touch target on the touch screen 151 for a certain time or more.

The double touch may be a touch which the short touch is applied onto the touch screen 151 continuously at least two times within a certain time.

The certain time described in the short touch, the long touch and the double touch may be determined by a user setup.

The multi touch may be a touch applied to at least two touch points on the touch screen 151 at the substantially same time.

The drag touch may be a touch which a touch starting from a first point of the touch screen 151 is continuously applied along one direction on the touch screen and released at a second point different from the first point.

In more detail, the drag touch may be a touch which a touch applied to one point of the touch screen 151 by a touch target is extended continuously in a state that the corresponding touch is maintained on the touch screen 151 and then released at another point different from the one point.

Also, the drag touch may mean a touch extended continuously from a touch applied to one point of the touch screen 151.

The flick touch may be a touch to which the drag touch is applied within a certain time. In more detail, the flick touch may be a touch which a touch target that performs the drag touch is released from the touch screen 151 within a certain time. In other words, the flick touch may be understood as a drag touch applied at a speed more than a predetermined speed.

The swype touch may be a drag touch applied in a straight line.

The pinch-in touch may be a touch which at least one of first and second touches applied to two different points (two points spaced apart from each other) on the touch screen 151 is extended to be close to the other one. For example, the pinch-in touch may be a touch achieved by an operation for making an interval of respective fingers be narrow in a state that the fingers touch the two points spaced apart from each other on the touch screen 151.

The pinch-out touch may be a touch which at least one of first and second touches applied to two different points (two points spaced apart from each other) on the touch screen 151 is extended to be far away from the other one. For example, the pinch-out touch may be a touch corresponding to an operation for making an interval of respective fingers be wide (to be far away from each other) in a state that the fingers touch the two points spaced apart from each other on the touch screen 151.

The hovering touch may be a touch corresponding to an operation of a touch target on a space far away from the touch screen 151 while the touch target does not touch the touch screen 151, and, for example, may be the proximity touch described in FIG. 1. For example, the hovering touch may be a touch corresponding to an operation of the touch target maintained at one point spaced apart from the touch screen 151 for a certain time or more.

In this specification, the case where the predetermined touch for outputting the second notification panel is the drag touch will be described exemplarily. However, the aforementioned various kinds of touches may equally/similarly be applied to the predetermined touch.

Also, the touch for outputting the first notification panel is not limited to the drag touch and may be applied to one of the aforementioned various kinds of touches.

The aforementioned description will be understood more clearly with reference to FIG. 4.

First of all, as shown in (a) of FIG. 4, the controller 180 may set a notification mode of an application 400 to a specific mode (sensitive mode) on the basis of a user request.

As shown in (a) of FIG. 4, if notification information 410 of the application 400 is received through the wireless communication unit 110 in a state that a notification mode of the application is set to a specific mode (sensitive mode), the controller 180 may not display the notification information 410 of the application on the first notification panel 350.

Afterwards, in a state that the first notification panel 350 is output, based on the touch (or predetermined touch, for example, a drag touch) applied to one area 352 of the first notification panel, the controller 180 may output at least a part of a second notification panel 360 different from the first notification panel 350 on the touch screen 151 as shown in (d) of FIG. 4.

The notification information 410 of the application of which notification mode is set to a specific mode (sensitive mode) may be displayed on the second notification panel 360.

Through the aforementioned configuration, the present invention may provide an optimized UI/UX that sets a notification mode of an application to a specific mode (sensitive mode) for outputting notification information at a user's desired time and allows a user to check notification information of the application set to a specific mode (sensitive mode) at the user's desired time.

Hereinafter, a method for outputting notification information of an application of which notification mode is set to a sensitive mode will be described in more detail with reference to the accompanying drawings.

FIGS. 5a, 5b, 5c, and 5d are conceptual diagrams illustrating a method for outputting notification information of an application of which notification mode is set to a sensitive mode in accordance with one embodiment of the present invention.

As described above, the mobile terminal 100 according to the present invention includes an application of which notification mode is set to a specific mode (sensitive mode) and, in the case where notification information of the corresponding application is received through the wireless communication unit 110, may not display the notification information on the first notification panel. Afterwards, based on the drag touch starting from one area (for example, an area adjacent to one edge of the first notification panel) of the first notification panel and applied in one direction, the controller 180 may display the second notification panel displaying the notification information on the touch screen 151.

Meanwhile, in the present invention, the second notification panel displaying notification information of an application of which notification mode is set to a sensitive mode may be output to the touch screen 151 in various manners.

Figure 5A:
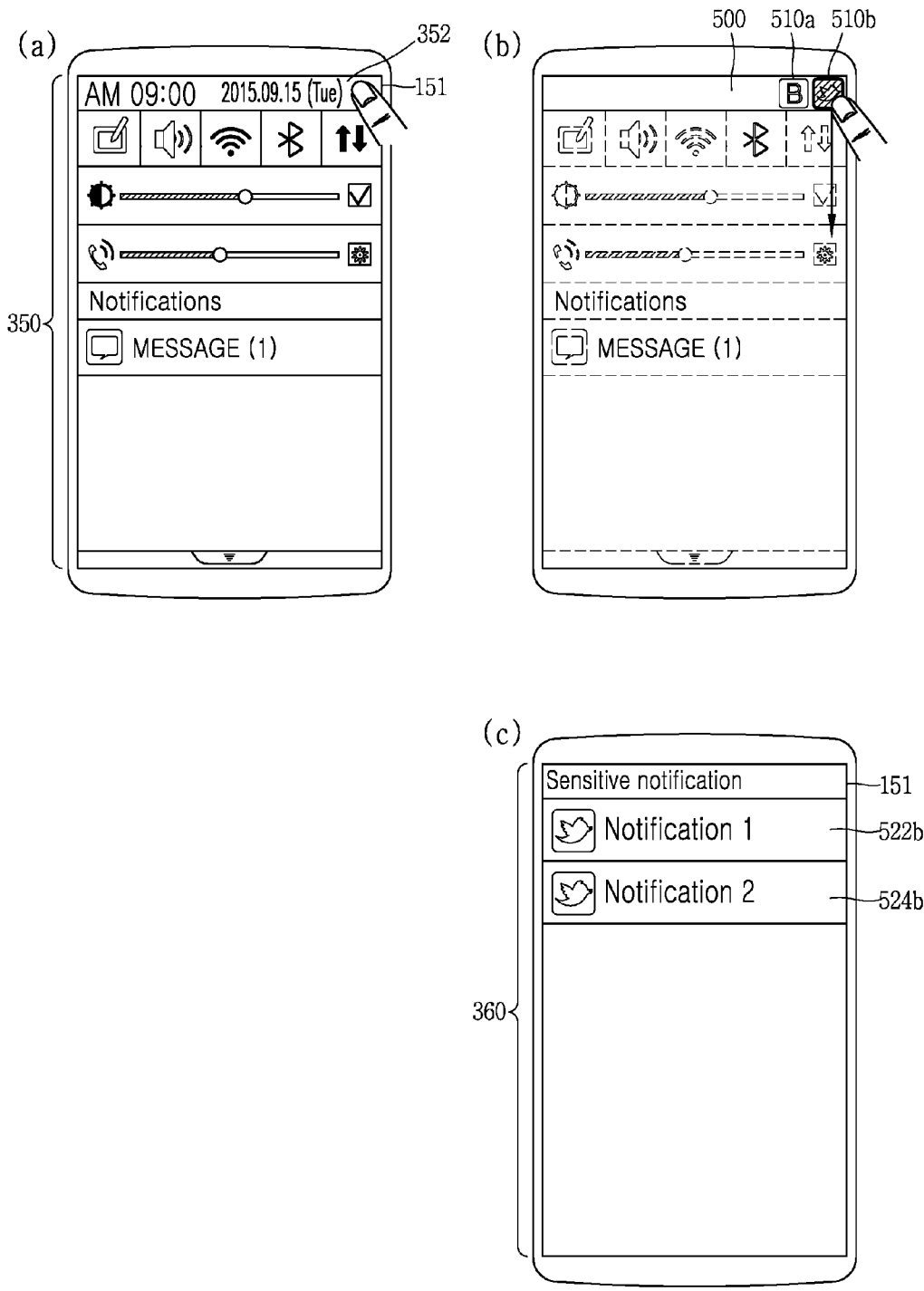
FIGS. 5a, 5b, 5c, and 5d are conceptual diagrams illustrating a method for outputting notification information of an application of which notification mode is set to a sensitive mode in accordance with one embodiment of the present invention.

For example, as shown in (a) of FIG. 5*a*, if one area 352 of the first notification panel is touched in a state that the first notification panel 350 has been output, the controller 180 may output icons 510*a* and 510*b* of at least one of applications of which notification mode is set to a specific mode (sensitive mode), to one area, as shown in (b) of FIG. 5*a*.

In this case, the icons 510*a* and 510*b* may be icons of an application generating (or received through the wireless communication unit 110) notification information among the applications of which notification mode is set to a specific mode (sensitive mode).

Afterwards, as shown in (b) of FIG. 5*a*, based on the drag touch starting from one (for example, 510*b*) of the icons 510*a* and 510*b* and applied in one direction (for example, downward direction), the controller 180 may output the second notification panel 360 including (displaying) notification information 522*b* and 524*b* of the application corresponding to the one icon, to the touch screen 151 as shown in (c) of FIG. 5*a*.

Figure 5B:
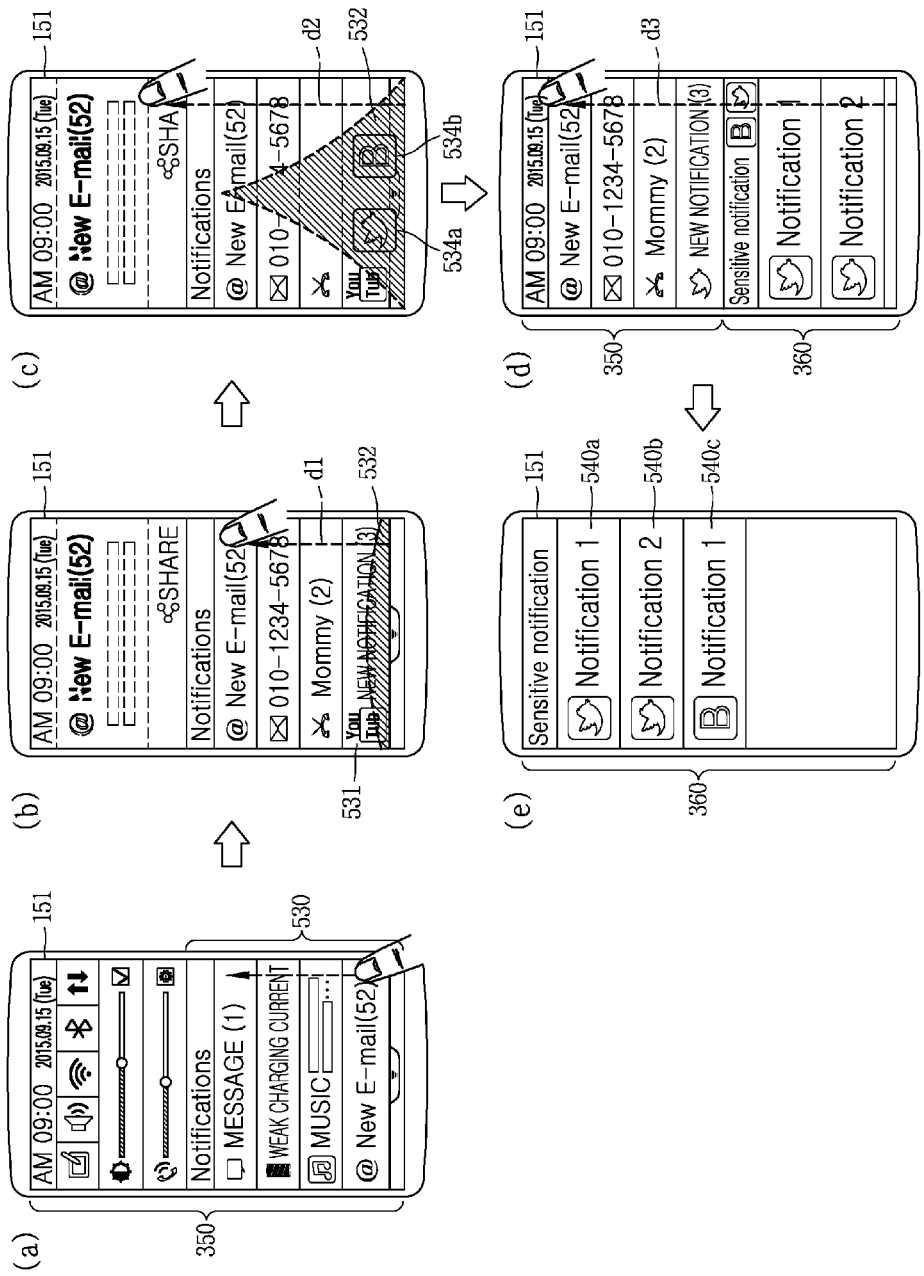

For another example, as shown in (a) of FIG. 5*b*, the first notification panel 350 may include a specific area 530 where notification information is displayed. If a size of the notification information (or the number of notification information) displayed on the specific area 530 exceeds a size of the specific area 530, the controller 180 may operate a scroll on the basis of a drag touch applied to the specific area 530, as shown in (a) and (b) of FIG. 5*b*.

Meanwhile, an order of the notification information displayed on the specific area 530 may correspond to an order of generating notification information (or received through the wireless communication unit 110).

If a drag touch is applied to the specific area in an opposite direction (upward direction) to the one direction (downward direction) in a state that notification information corresponding to the last order has been displayed on the specific area 530, the controller 180 may output the second notification panel displaying notification information of the application of which notification mode is set to a specific mode (sensitive mode), to the touch screen 151.

In more detail, as shown in (b) of FIG. 5*b*, in a state that notification information 531 corresponding to the last order has been displayed on the specific area 530, if a drag touch is applied toward the opposite direction (upward direction) by a first distance d1, the controller 180 may display a graphic image 532, which indicates that a scroll using a drag touch applied toward the opposite direction on the specific area 530 is not allowed, on the specific area.

Afterwards, as shown in (c) of FIG. 5*b*, if the drag touch (the drag touch applied toward upward direction) is applied with a second distance d2 longer than the first distance, the controller 180 may display icons 534*a* and 534*b* of an application of which notification mode is set to a specific mode (sensitive mode), on the graphic image 532.

The icons 534*a* and 534*b* displayed on the graphic image 532 may be icons of an application generating notification information (or application received through the wireless communication unit 110) among applications of which notification mode is set to a specific mode (sensitive mode). Also, the graphic image 532 may be varied depending on the distance to which the drag touch is applied.

Afterwards, as shown in (d) of FIG. 5*b*, if the drag touch (the drag touch applied toward upward direction) is applied with a third distance d3 longer than the second distance, the controller 180 may display the second notification panel 360 including notification information of the application of which notification mode is set to a specific mode (sensitive mode) on the touch screen 151.

At this time, a part of the second notification panel 360 may be displayed on the touch screen 151.

Afterwards, if the drag touch applied with longer than the third distance is released, as shown in (e) of FIG. 5*b*, the controller 180 may output the second notification panel 360 including (displaying) notification information 540*a*, 540*b*, and 540*c* of an application of which notification mode is set to a specific mode (sensitive mode), to the touch screen 151.

Meanwhile, in the present invention, even in a state that the entire first notification panel is not output, the second notification panel displaying notification information of an application of which notification mode is set to a specific mode (sensitive mode) may be output to the touch screen.

Figure 5C:
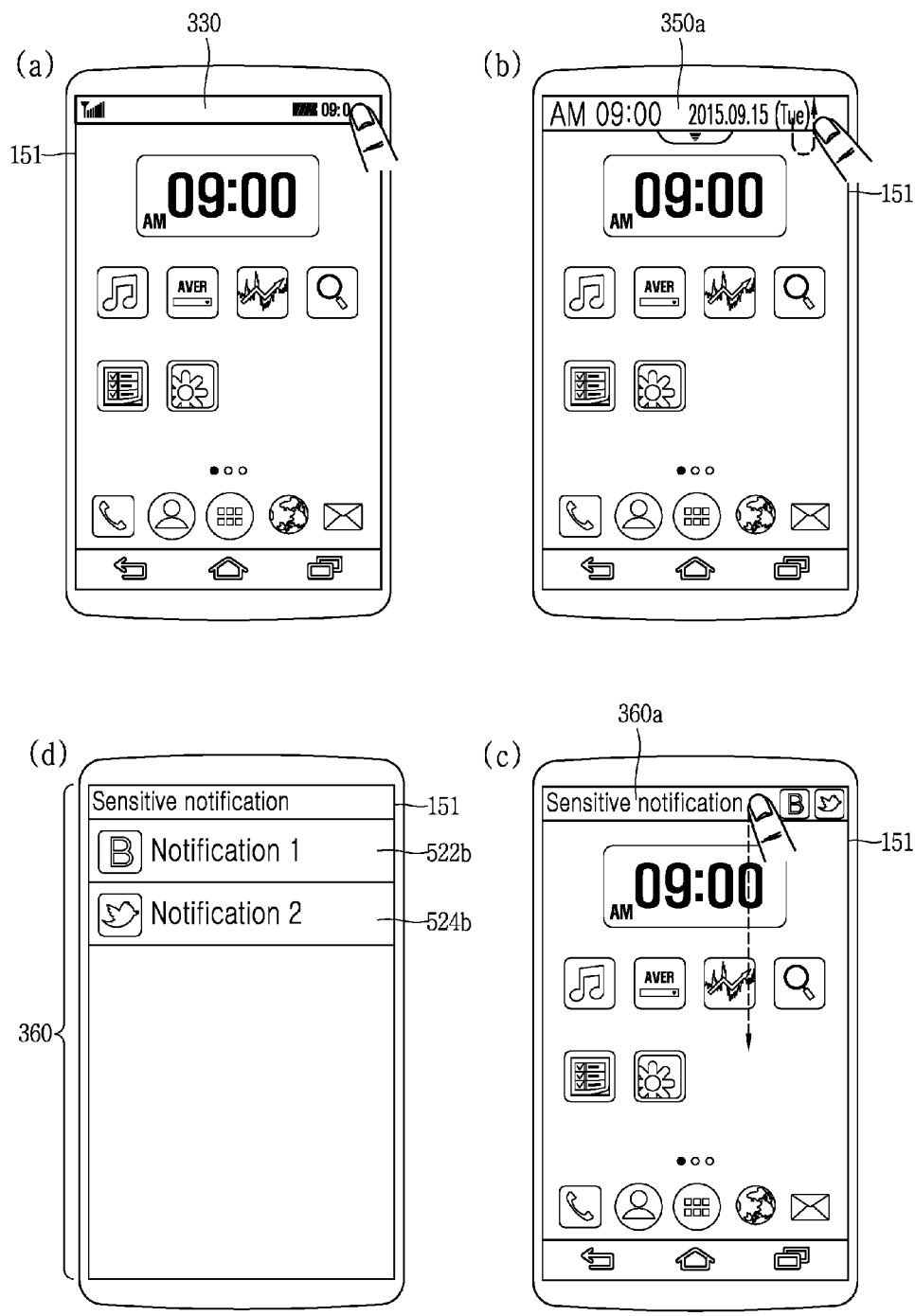

For example, as shown in (a) of FIG. 5*c*, when a touch is applied to one area 330 (for example, status display line) of the touch screen 151, a part 350*a* of the first notification panel may be output to one area 330 of the touch screen 151.

The part 350*a* of the first notification panel may be displayed as long as the touch is maintained on the touch screen 151.

As shown in (b) of FIG. 5*c*, in a state that the part of the first notification panel has been output, if another touch including a pattern (or a predetermined pattern) is applied continuously to the applied touch, the part 350*a* of the first notification panel may be changed to a part 360*a* of the second notification panel, as shown in (c) of FIG. 5*c*.

The pattern (or predetermined pattern), for example, may be a pattern operating to one direction and going back to an opposite direction to the one direction, as shown in (b) of FIG. 5*c*.

If the touch including a pattern (or a predetermined pattern) is applied continuously to the applied touch, the controller 180 may change the part 350*a* of the first notification panel output to one area 330 of the touch screen into a part 360*a* of the second notification panel being capable of outputting notification information of an application of which notification mode is set to a specific mode (sensitive mode).

Afterwards, as shown in (c) of FIG. 5*c*, in the state that the part 360*a* of the second notification panel has been output (in a state that the touch having the pattern (the predetermined touch) is maintained), the controller 180 may output at least a part of the second notification panel 360 to the touch screen 151, as shown in (d) of FIG. 5*c*, based on the drag touch applied in one direction (for example, downward direction) continuously to the touch including the pattern (or predetermined pattern).

As shown in (d) of FIG. 5*c*, notification information 522*b* and 524*b* of an application of which notification mode is set to a specific mode (sensitive mode) may be displayed on the second notification panel 360.

For another example, if a drag touch starting from at least two points is applied to one area (for example, status display line) of the touch screen 151, the controller 180 may output the second notification panel instead of the first notification panel to the touch screen 151.

Figure 5D:
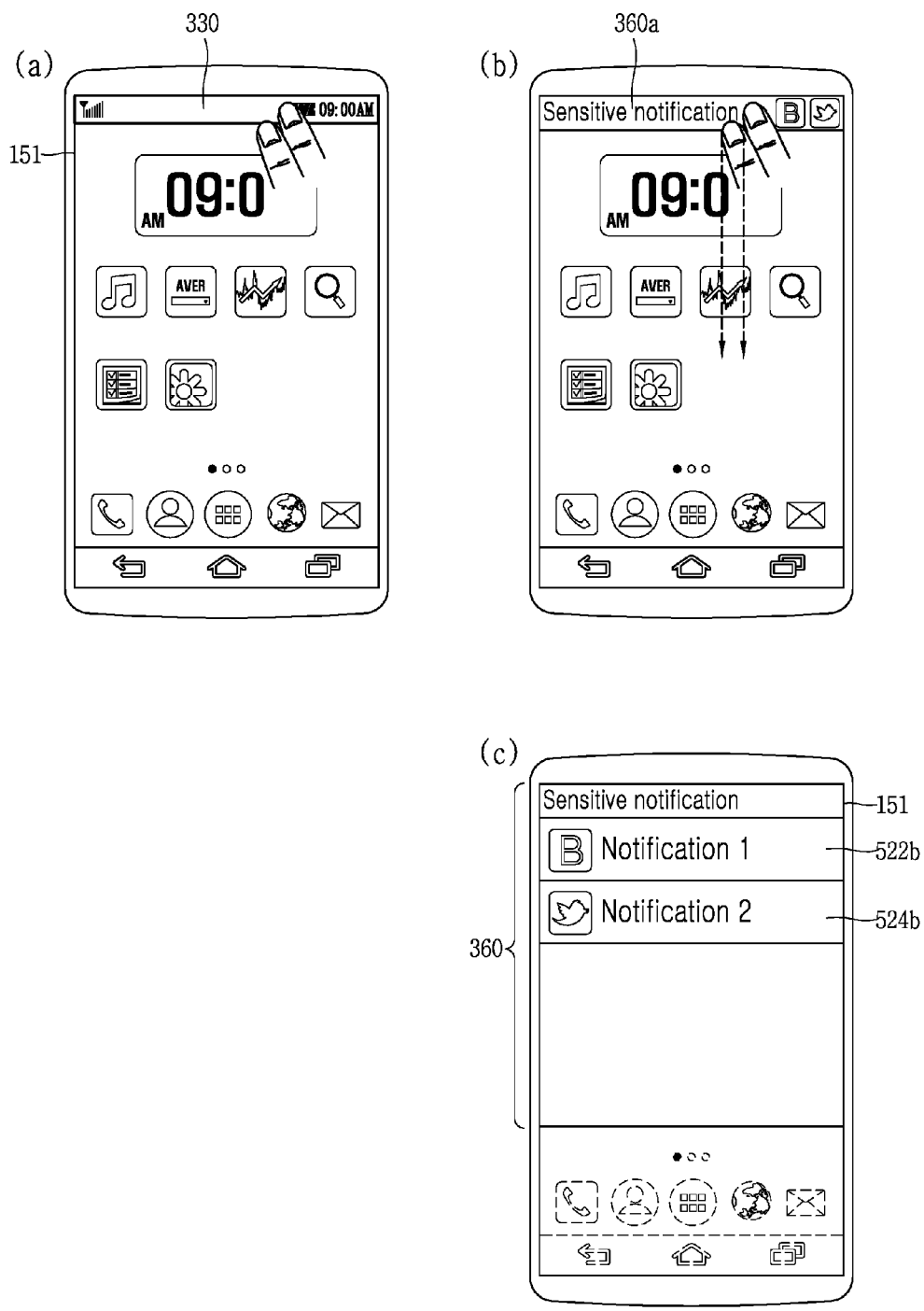

Referring to FIG. 5*d*, as shown in (a) of FIG. 5*d*, if touches are applied to at least two points on one area 330 of the touch screen 151, the part 360*a* of the second notification panel instead of the first notification panel (or a part of the first notification panel) may be displayed on the one area 330, as shown in (b) of FIG. 5*d*.

Afterwards, if a drag touch (that is, drag touch starting from at least two points) applied in one direction continuously to the touches applied to the at least two points is applied, as shown in (c) of FIG. 5d, the controller 180 may display a second touch panel 360 displaying notification information 522b and 524b of an application of which notification mode is set to a specific mode (sensitive mode).

Through the aforementioned configuration, the present invention may provide various user interfaces that output the second notification panel displaying notification information of an application of which notification mode is set to a sensitive mode, to the touch screen.

Meanwhile, in the present invention, applications of which notification mode is set to a sensitive mode may be grouped into at least two groups. Hereafter, a method for outputting notification information of applications grouped into at least two groups will be described with reference to the accompanying drawings.

Figure 6:
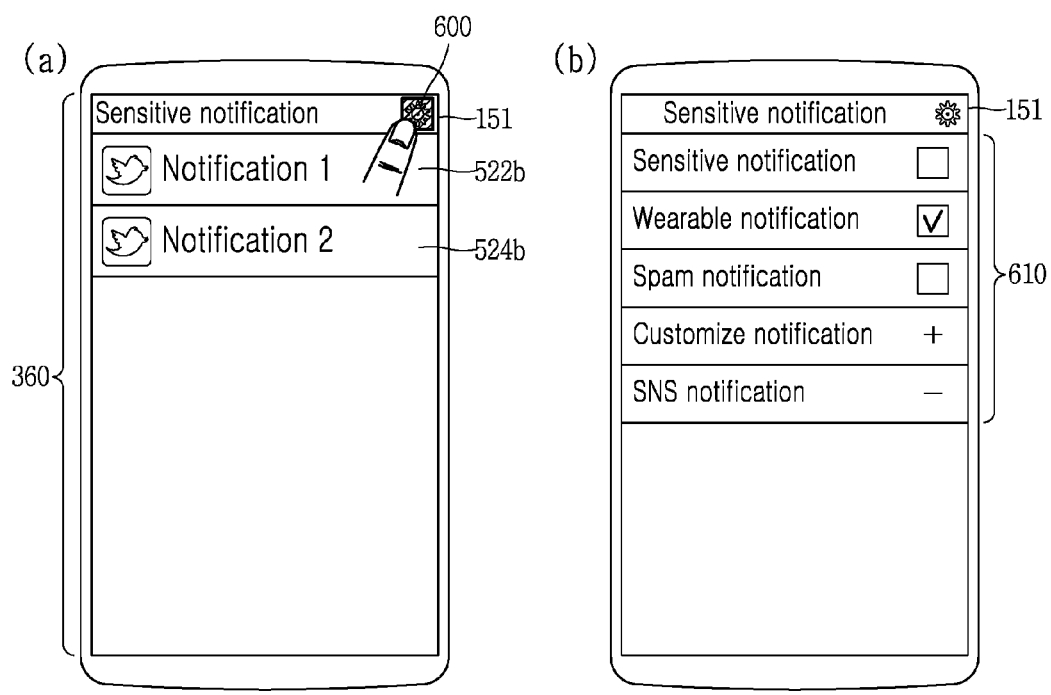
FIGS. 6, 7a, and 7b are conceptual diagrams illustrating a method for grouping applications of which notification mode is set to a sensitive mode into at least one group and for outputting notification information of grouped applications in accordance with one embodiment of the present invention.
Figure 7A:
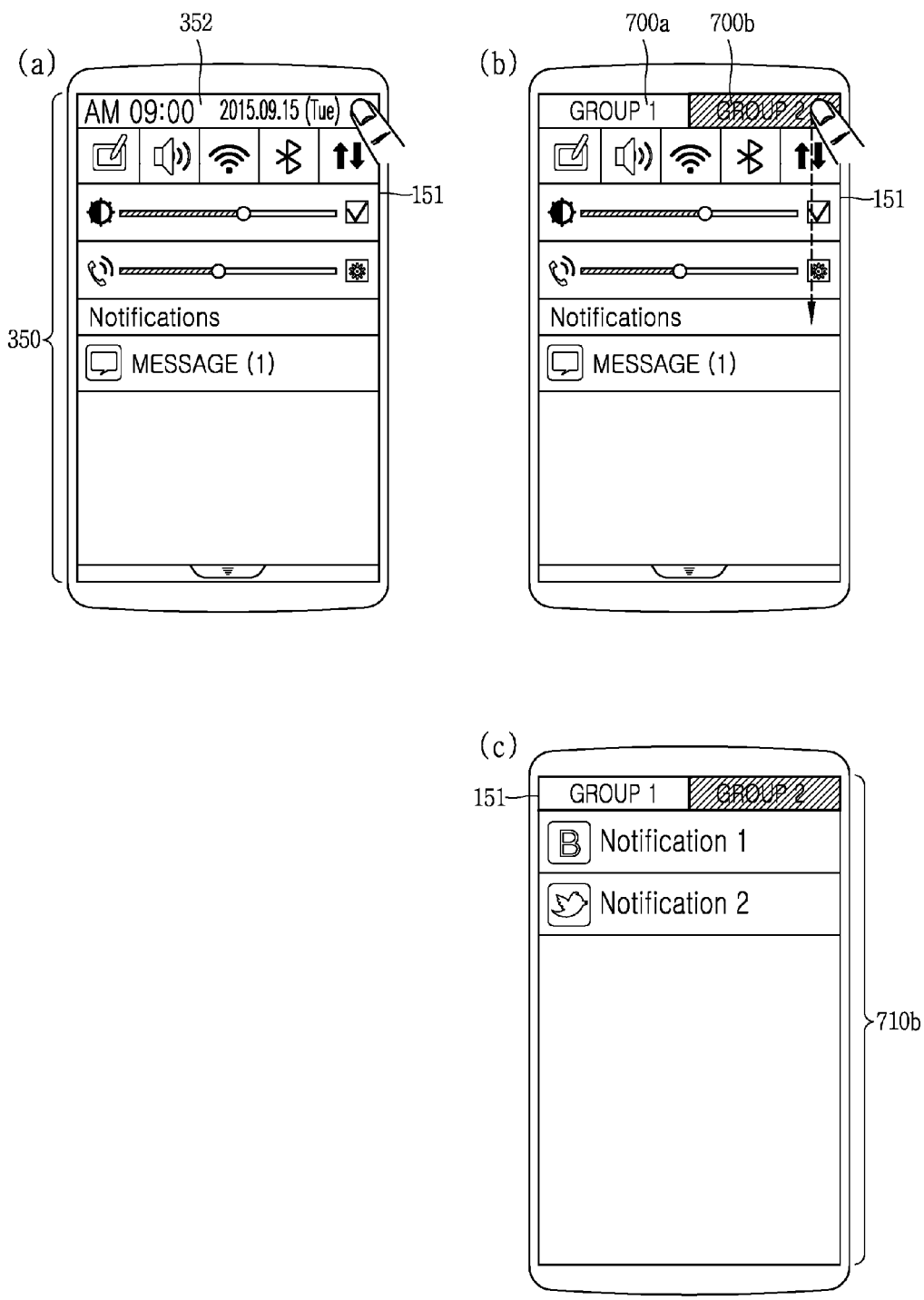
Figure 7B:
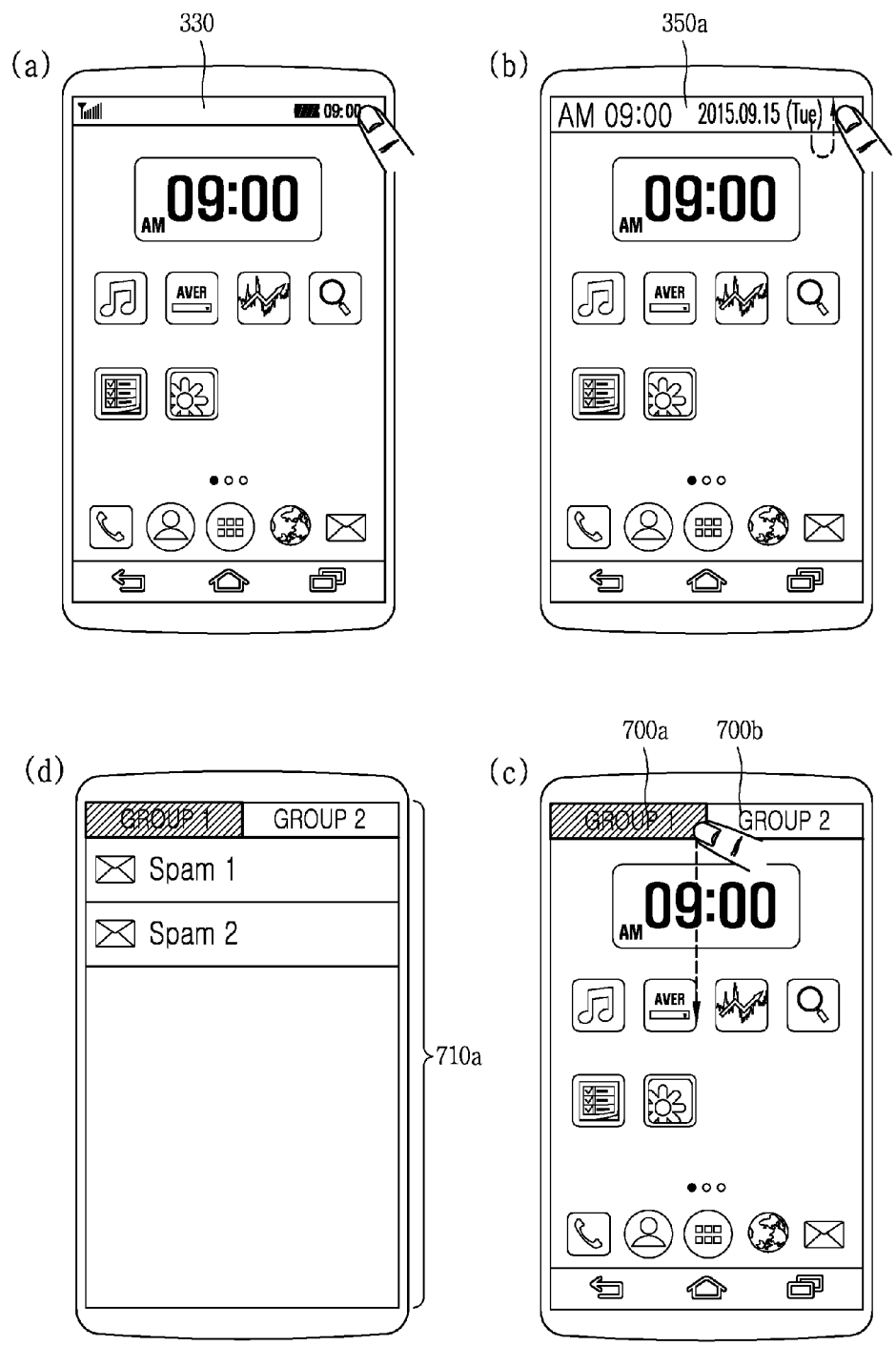

FIGS. 6, 7a and 7b are conceptual views illustrating a method for grouping applications of which notification mode is set to sensitive mode into at least one group and outputting notification information of the grouped applications in accordance with one embodiment of the present invention.

In the following description, a sensitive mode may mean a specific mode as described above.

The mobile terminal 100 according to the present invention may group applications of which notification mode is set to a sensitive mode into at least two groups in various ways.

For example, as shown in (a) of FIG. 6, a setup icon 600 associated with the function for grouping applications may be displayed on the second notification panel 360. Although not shown, the setup icon 600 may be displayed on the first notification panel.

When the setup icon 600 is selected (touched), the controller 180 may output an item 610 indicating a predetermined category (or group) to the touch screen 151 (for example, on the second notification panel 360), as shown in (b) of FIG. 6.

The predetermined category may mean a category previously categorized into at least two groups to set a notification mode to a sensitive mode.

For example, the category made configured to set a notification mode to a sensitive mode may include wearable-related applications, spam-related applications, customized-related applications, SNS-related applications, etc.

If at least two categories (groups) out of the items 610 are selected, the controller 180 may group the applications included in the corresponding category into one group. In this case, the controller 180 may group the selected applications included in at least two categories into at least two groups.

In addition, the mobile terminal according to the present invention may group applications of which notification mode is set to a sensitive mode into at least two groups in the setup menu described in FIG. 3.

The controller 180 according to the present invention may group a plurality of applications of which notification mode is set to a sensitive mode into at least two groups based on a user's request.

Afterwards, in a state that the at least two groups have been set, if a touch is applied to one area 352 of the first notification panel 350 as shown in (a) of FIG. 7a, the controller 180 may display graphic objects 700a and 700b related to the at least two groups on the one area 352 as shown in (b) of FIG. 7a. At this time, for example, in the case that notification information of applications included in each of the at least two groups is generated, the controller 180 may display the graphic objects 700a and 700b related to the at least two groups on the one area 352.

Although at least two groups have been set, if only notification information of applications included in one group is generated, the controller 180 may display the icon of applications where the notification information is generated, on the one area 352.

Afterwards, if a predetermined touch is applied to one (for example, 700b) of the graphic objects 700a and 700b (for example, if a drag touch applied in one direction (downward direction) from one of the graphic objects is applied), the controller 180 may display a second notification panel 710b, on which notification information of applications included in a group corresponding to the one graphic object 700b is displayed, on the touch screen 151, as shown in (c) of FIG. 7a.

For another example, as shown in (a) of FIG. 7b, if a touch is applied to one area 330 (for example, display status line) of the touch screen 151 in a state that the first notification panel 350 has not been output, the controller 180 may output a part 350a of the first notification panel to the one area 330, as shown in (b) of FIG. 7b.

If a touch including a predetermined pattern is applied continuously to the touch (for example, if a drag touch starting from downward direction and then coming back to upward direction is applied) in a state that the part 350a of the first notification panel has been output to one area 330 of the touch screen 151 (or in a state that at least two groups have been set), the controller 180 may change the part 350a of the first notification panel into the graphic objects 700a and 700b related to the at least two groups as shown in (c) of FIG. 7b.

Afterwards, as shown in (c) of FIG. 7b, based on a drag touch starting from one (for example, 700a) of the graphic objects 700a and 700b, the controller 180 may output the second notification panel 710a, on which notification information of applications included in a group corresponding to the one graphic object is displayed, to the touch screen 151, as shown in (d) of FIG. 7b.

Hereinafter, a method for controlling a notification panel in the present invention will be described in more detail with reference to the accompanying drawings.

Figure 8:
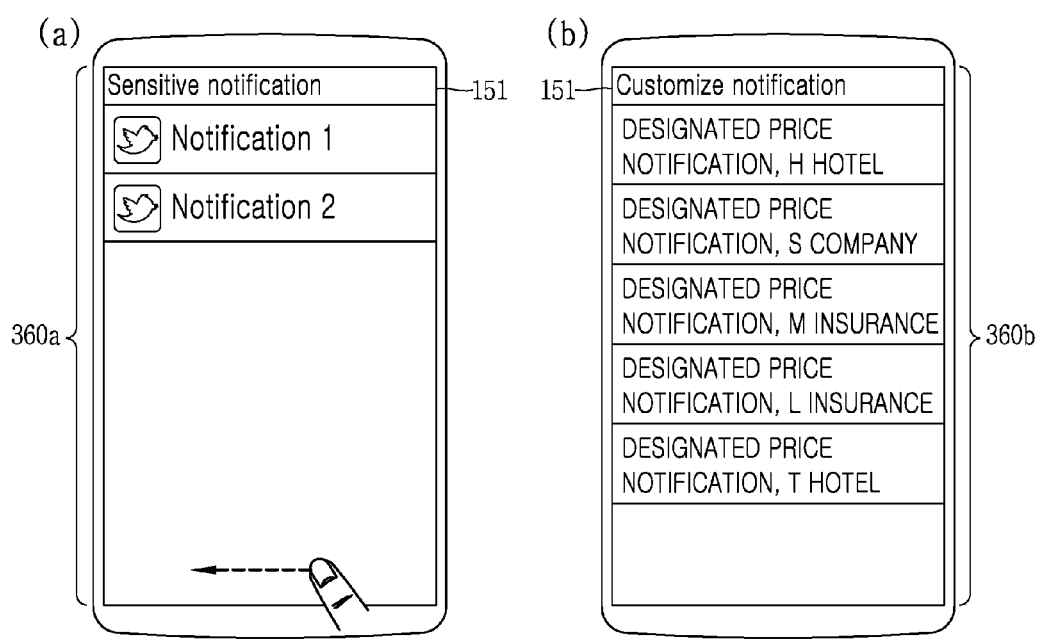
FIGS. 8, 9a, and 9b are conceptual diagrams illustrating a method for controlling notification panels in accordance with one embodiment of the present invention.
Figure 9A:
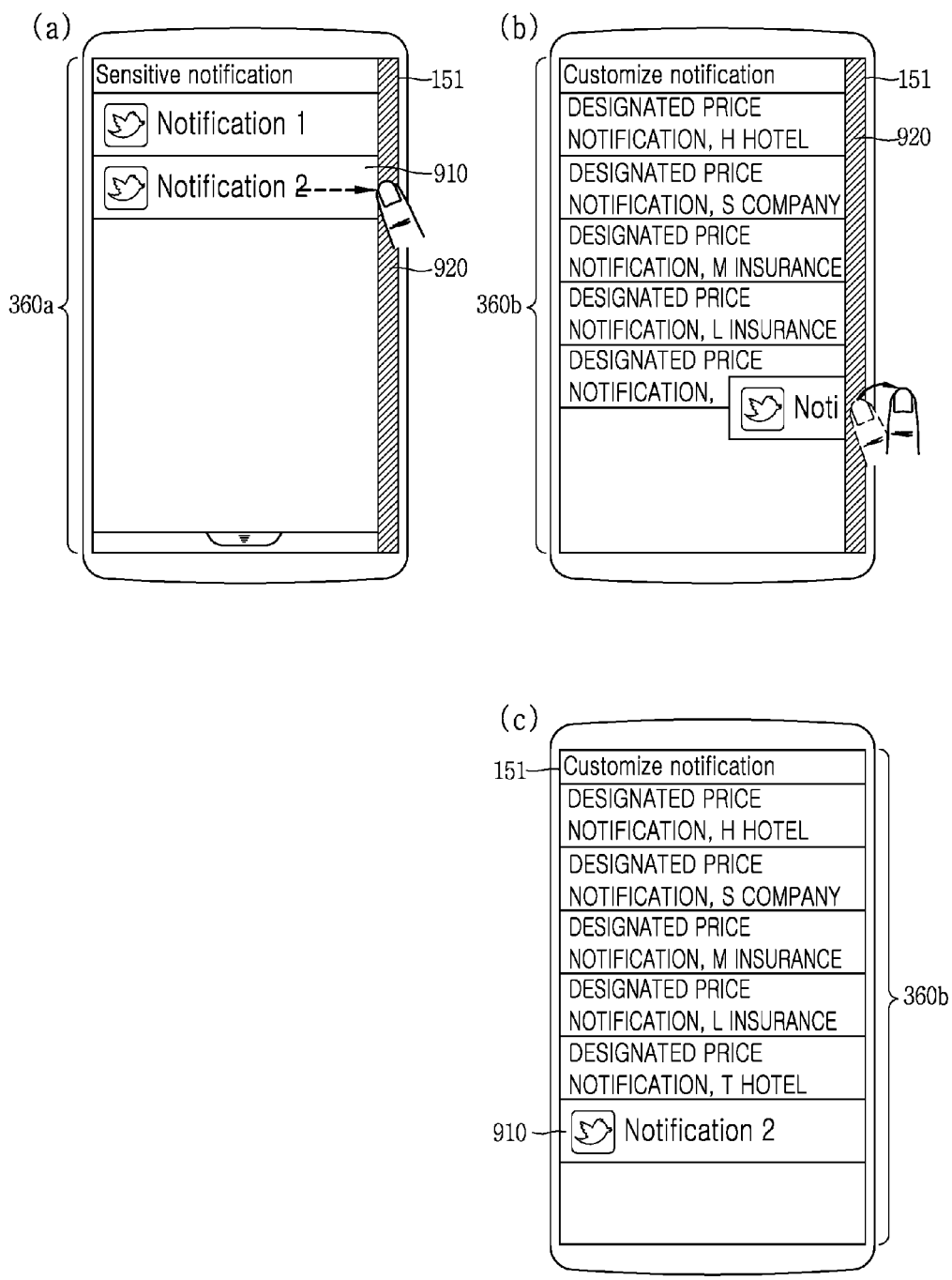
Figure 9B:
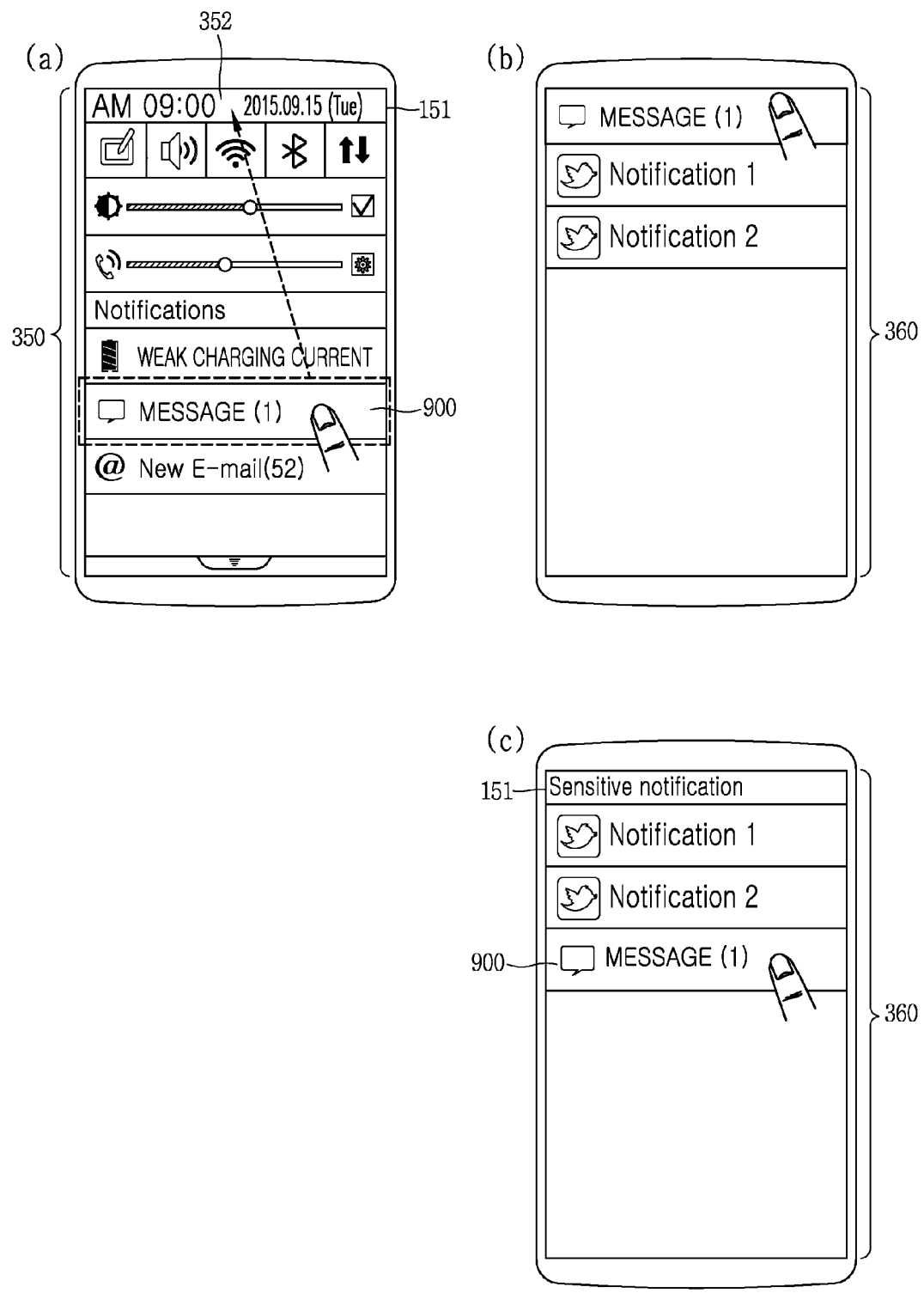

FIGS. 8, 9a and 9b are conceptual views illustrating a method for controlling a notification panel in accordance with one embodiment of the present invention.

In a state that a plurality of applications of which notification mode is set to a sensitive mode have been grouped into at least two groups, the controller 180 may output the second notification panel 360a including notification information of applications included in one group to the touch screen 151, as shown in (a) of FIG. 8.

As shown in (a) of FIG. 8, if a drag touch is applied to the second notification panel 360a in one direction (for example, direction toward the right or direction toward to the left) in a state that the second notification panel 360a has been output, the controller 180 may output a third notification panel 360b, on which notification information of applications included in the other group different from the one group is displayed, to the touch screen 151 as shown in (b) of FIG. 8.

Through the aforementioned configuration, the present invention may provide a user interface that may more easily output notification information of applications, included in different groups, of which notification mode is set to a sensitive mode.

Meanwhile, in a state that the second notification panel displaying notification information of applications included in one group has been displayed, the controller 180 may output the third notification panel displaying notification information of applications included in the other group different from the one group to the touch screen 151 when a drag touch starting from notification information displayed on the second notification panel reaches one side of the second notification panel.

For example, as shown in (a) of FIG. 9*a*, in a state that the second notification panel 360*a* displaying notification information of applications included in one group has been displayed on the touch screen 151, if a drag touch starting from the notification information 910 reaches one side 920 of the second notification panel 360*a*, the controller 180 may output the third notification panel 360*b* displaying notification information of applications included in the other group different from the one group to the touch screen 151 as shown in (b) of FIG. 9*a*.

Afterwards, as shown in (b) of FIG. 9*a*, if the drag touch is released from the third notification panel 360*b*, the controller 180 may display notification information 910 of the second notification panel to which the drag touch is applied, on the third notification panel 360*b*.

At this time, the controller 180 may set applications associated with notification information 910 to which the drag touch is applied, to the other group (for example, group displaying notification information on the third notification panel).

For example, in a state that notification information of an application CA' included in a first group is displayed on the second notification panel, if the drag touch starting from the notification information is released from the third notification panel displaying notification information of applications included in a second group as described in FIG. 9*a*, the application CA' may be set to the second group.

Meanwhile, in the present invention, applications of which notification mode is set to a normal mode may be set to a sensitive mode using the drag touch.

For example, as shown in (a) of FIG. 9*b*, if the drag touch starting from the notification information 900 displayed on the first notification panel 350 reaches one area 352 of the first notification panel 350, the controller 180 may change the first notification panel 350 into the second notification panel 360 outputting notification information of applications of which notification mode is set to a sensitive mode, as shown in (b) of FIG. 9*b*.

Afterwards, if the drag touch is released from the second notification panel 360, the controller 180 may display the notification information 900 to which the drag touch is applied, on the second notification panel 360, as shown in (c) of FIG. 9*b*.

In this case, the controller 180 may set a notification mode of applications associated with notification information to which the drag touch is applied, to a sensitive mode.

For example, an application CB' (application CB' associated with notification information 900 to which drag touch is applied) of which notification mode is set to a normal mode may change its notification mode to a sensitive mode using the method of FIG. 9*b*.

Through the aforementioned configuration, the present invention may provide a user interface that may more simply change a group of applications of which notification mode is set to a sensitive mode and may more simply set applications of which notification mode is set to a normal mode to a sensitive mode.

Meanwhile, although not shown, the present invention may provide a user interface that may output notification information generated in a wearable device to the touch screen at the user's desired time.

For example, the aforementioned methods may equally/similarly be applied to the case where a notification mode of notification information received from the wearable device is set to the sensitive mode.

Hereinafter, an InApp mode according to the present invention will be described.

FIGS. 10*a*, 10*b*, 10*c*, and 10*d* are conceptual diagrams illustrating a method for outputting notification information of applications of which notification mode is set to an InApp mode in accordance with another embodiment of the present invention.

As described above, an InApp mode 320*d* may be a mode for outputting notification information of an application only in a state that the corresponding application has been operated (or in a state that a running screen of the corresponding application has been output to the touch screen 151).

The case where a notification mode of an application 'C' is set to the InApp mode will be described as an example.

Figure 10A:
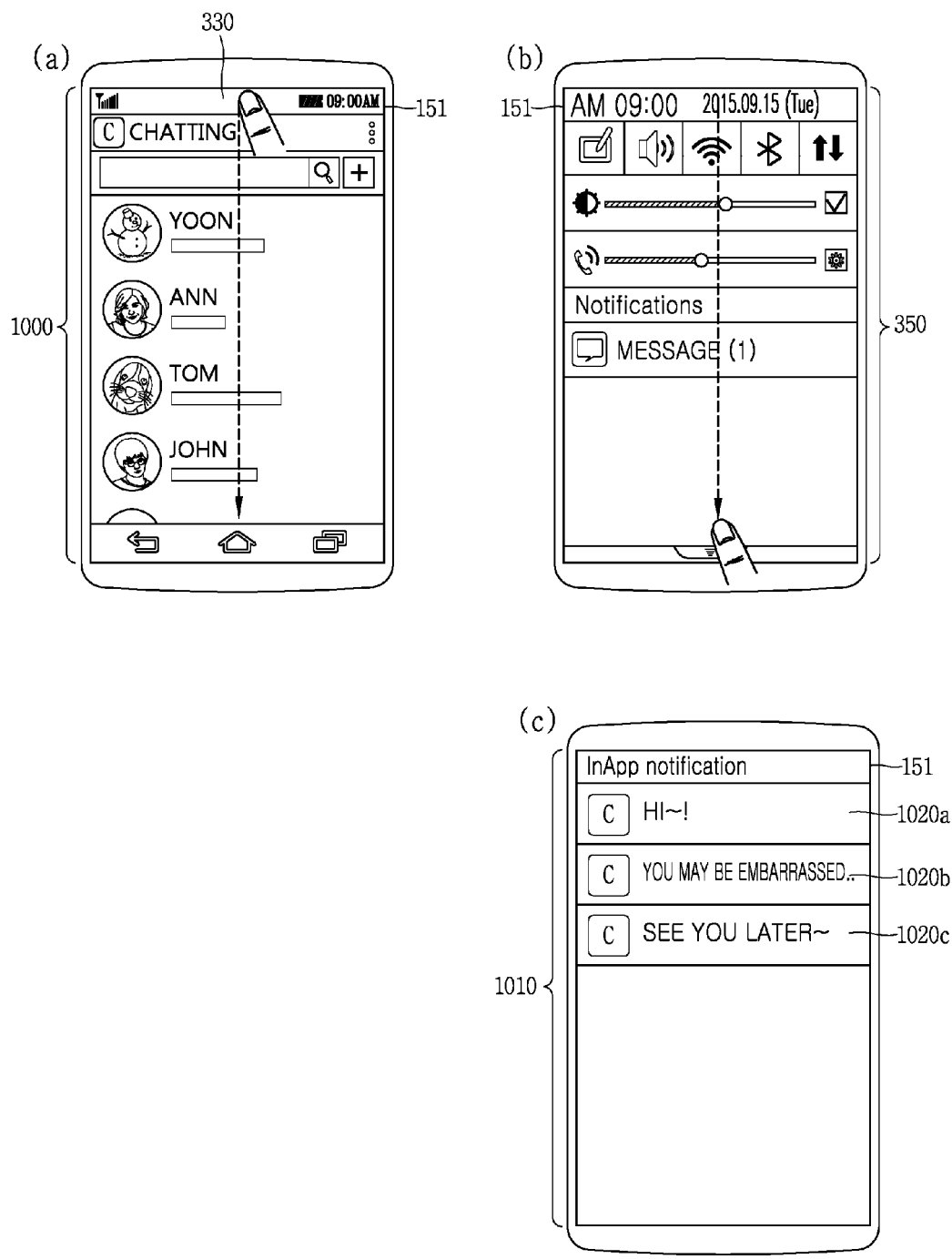
FIGS. 10a, 10b, 10c, and 10d are conceptual diagrams illustrating a method for outputting notification information of an application of which notification mode is set to an In-App mode in accordance with another embodiment of the present invention.

As shown in (a) of FIG. 10*a*, in a state that the application 'C' has been operated (or in a state that a running screen of the application 'C' has been output to the touch screen 151), if a drag touch starting from one area 330 (for example, status display line) of the touch screen is applied, the controller 180 may output the first notification panel 350, as shown in (b) of FIG. 10*a*. In this case, notification information of application of which notification mode is set to an InApp mode may not be displayed on the first notification panel 350.

If the drag touch starting from one area 352 of the first notification panel is applied in a state that the first notification panel 350 has been displayed, the controller 180 may output a new notification panel 1010, on which notification information of applications set to an InApp mode is displayed, to the touch screen 151 as shown in (c) of FIG. 10*a*.

For example, notification information of the application 'C' may be displayed on the new notification panel 1010.

Figure 10B:
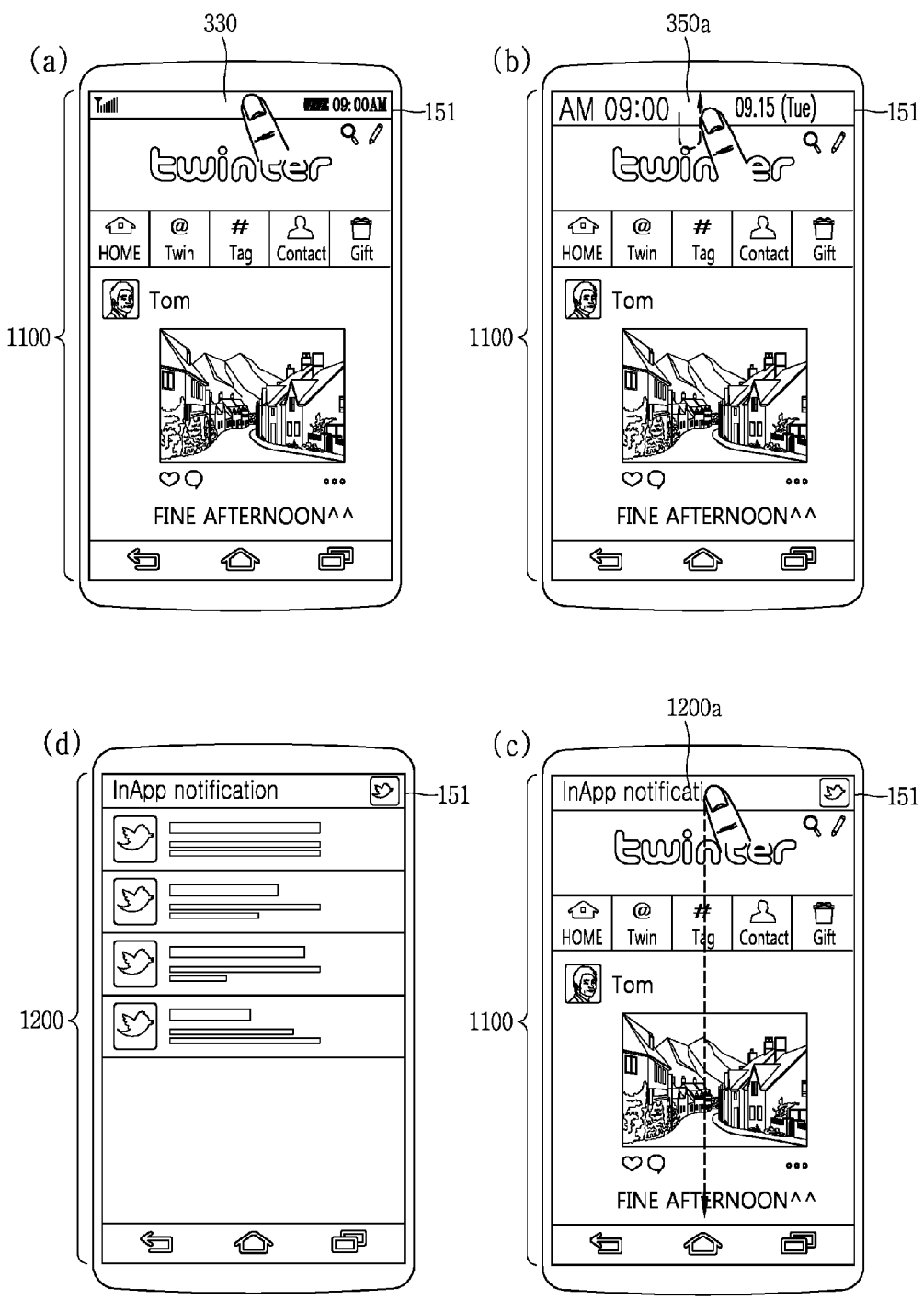

For another example, if a touch is applied to one area 330 (for example, status display line) of the touch screen in a state that a running screen 1100 of applications set to an InApp mode has been output to the touch screen 151, the controller 180 may display a part 350*a* of the first notification panel on the one area 330, as shown in (b) of FIG. 10*b*.

The part 350*a* of the first notification panel may be displayed as long as the touch is maintained.

As shown in (b) of FIG. 10*b*, if another touch including a predetermined pattern is applied continuously to the applied touch in a state that the part 350*a* of the first notification panel has been output, the controller 180 may change the part 350*a* of the first notification panel into one part 1200*a* of the new notification panel.

An icon of an application, which corresponds to a running screen currently output to the touch screen 151, among applications of which notification mode is set to an InApp mode, may be displayed on the one part 1200 of the new notification panel.

As shown in (c) of FIG. 10*b*, if the drag touch is applied in one direction continuously to the touch including the predetermined pattern, the controller 180 may output the new notification panel 1200 to the touch screen 151, as shown in (d) of FIG. 10*b*.

In this case, among applications of which notification mode is set to an InApp mode, notification information of an application corresponding to a running screen currently output to the touch screen 151 may be displayed on the new notification panel 1200.

Figure 10C:
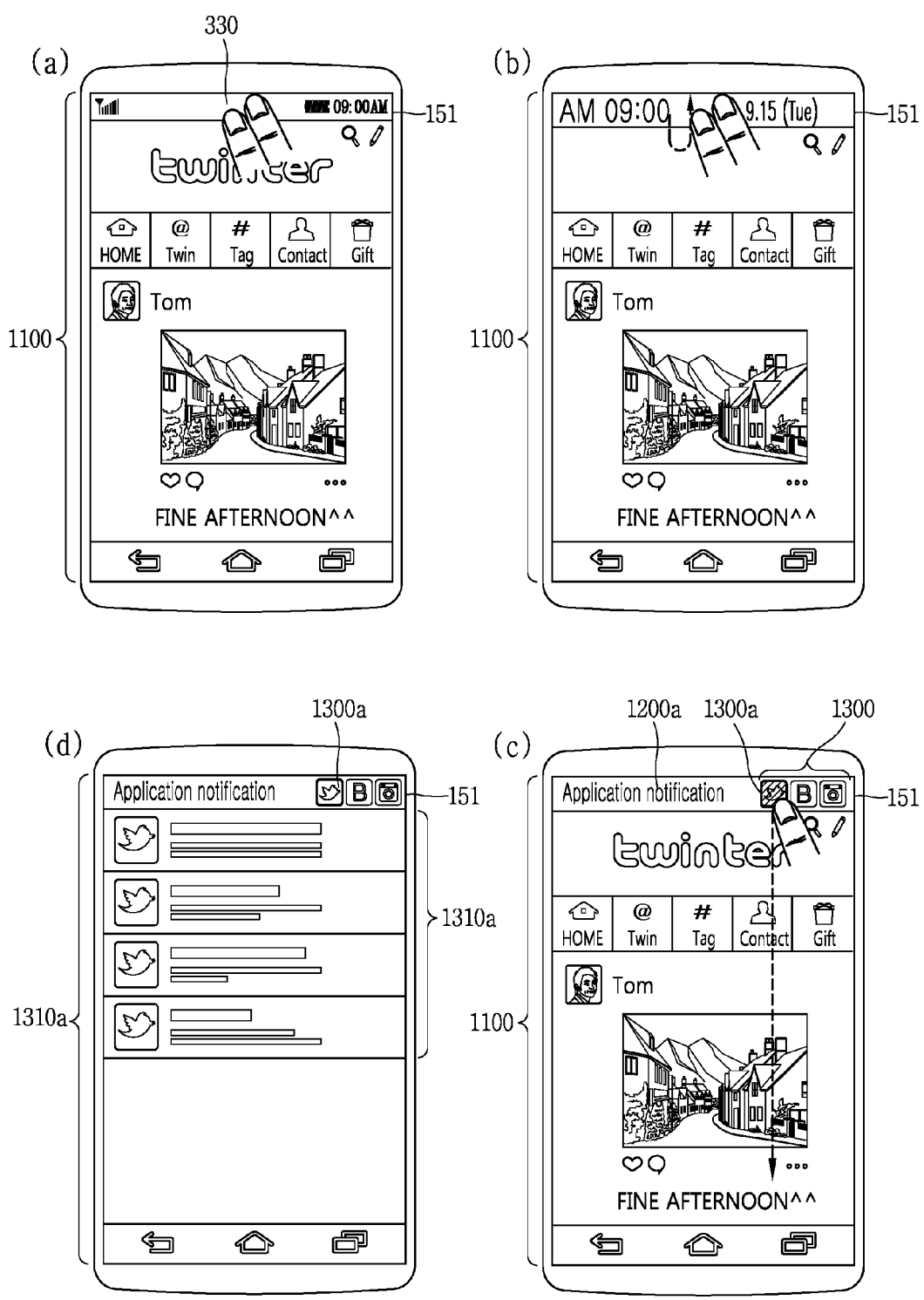

For another example, as shown in (a) of FIG. 10c, if a touch applied to at least two points is applied to one area 330 (for example, status display line) of the touch screen 151 in a state that an application of which notification mode is set to an InApp mode has been operated, the controller 180 may output one part 350a of the first notification panel to the touch screen 151.

Afterwards, if a touch including a predetermined pattern is applied continuously to the touch applied to the at least two points, the controller 180 may output the part 1200a of the new notification panel to the touch screen, as shown in (c) of FIG. 10c.

At this time, an icon 1300 of at least one application included in a group (or category) including applications corresponding to a running screen currently output to the touch screen 151 may be displayed on the part 1200a of the new notification panel.

For example, in the case that the application corresponding to the running screen currently output to the touch screen is SNS-related application, if the touch including a predetermined pattern is applied continuously to the touch applied to at least two points, icon(s) of the SNS-related application may be displayed on the part of the new notification panel.

Afterwards, based on a drag touch starting from one 1300a of icons 1300 of at least one application and applied in one direction, the controller 180 may output a notification panel 1310a, on which notification information of an application corresponding to the one icon 1300a is displayed, to the touch screen 151 as shown in (d) of FIG. 10c.

Figure 10D:
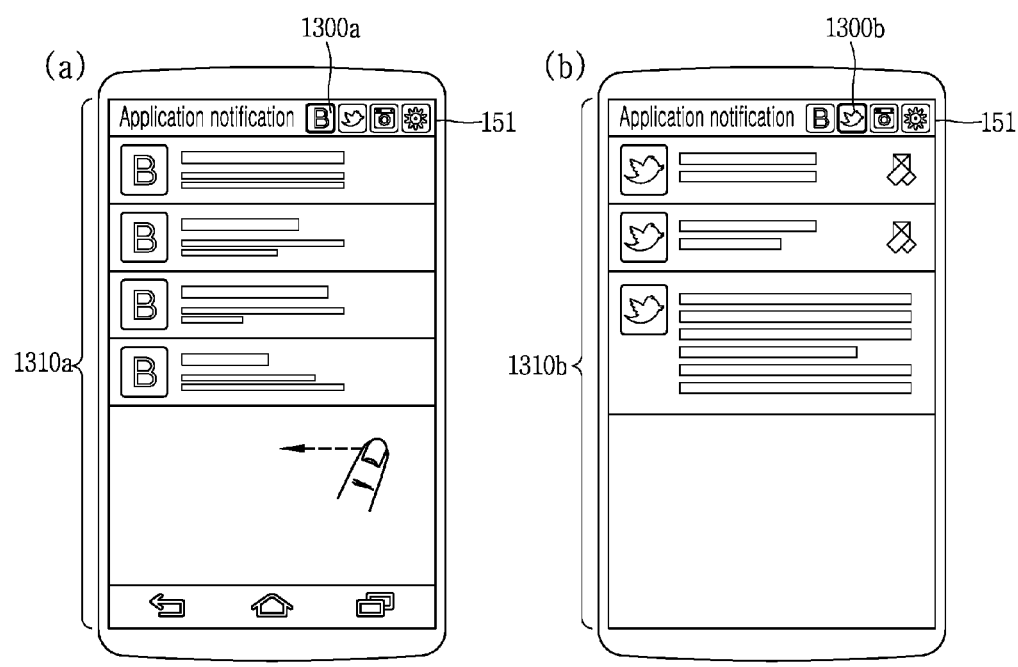

In a state that the notification panel 1310a including the notification information of the application corresponding to the one icon 1300a has been displayed, as shown in (a) of FIG. 10d, if the drag touch is applied in one direction (for example, direction toward the left), the controller 180 may output a notification panel 1310b, on which notification information of an application corresponding to the other one icon 1300b different from the one icon 1300a is displayed, to the touch screen 151 as shown in (b) of FIG. 10d.

Through the aforementioned configuration, the present invention may provide a UI/UX that may output only notification information of a running application, and may also provide a control method for optimally outputting notification information of an application corresponding to a group (category) to which the running application belongs.

As described above, the present invention may provide a new user interface that may identify notification information of an application at a user's desired time without immediately displaying the notification information on a first notification panel or status display line if the notification information is generated from the application.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal comprising:
a wireless communication unit;
a touch screen configured to output notification information received through the wireless communication unit for an application; and
a controller that controls the output of the notification information based on a set notification mode for the application,
wherein at least a part of a first notification panel is output on the touch screen based on a first touch input applied to a prescribed area of the touch screen, and
at least a part of a second notification panel different from the first notification panel is output on the touch screen based on a second touch input applied to a prescribed area of the first notification panel in a state in which at least a part of the first notification panel has been output, and
wherein, when the notification mode for the application is set to a specific mode, the notification information of the application is controlled to be displayed on the second notification panel, and
wherein when the notification mode for the application is set to the specific mode, the notification information of the application is not displayed on the first notification panel and the second notification panel including the notification information of the application is displayed on the touch screen in response to the second touch input applied to the prescribed area of the first notification panel.

2. The mobile terminal according to claim 1, wherein when the notification mode for the application is set to a normal mode, the notification information of the application is displayed on the first notification panel.

3. The mobile terminal according to claim 1, wherein when the notification mode for the application is set to the specific mode, the notification information of the application is prevented from being displayed on the first notification panel.

4. The mobile terminal according to claim 1, wherein the prescribed area of the touch screen is a status bar, and the prescribed area of the first notification panel is an area adjacent to one edge of the first notification panel.

5. The mobile terminal according to claim 4, wherein when the second touch input is a drag touch applied to the prescribed area of the first notification panel in a first direction, the controller controls to output the second notification panel to the touch screen based on the drag touch.

6. The mobile terminal according to claim 5, wherein when a touch is applied to the prescribed area of the first notification panel, the controller controls to output icons for at least one application that has the notification mode set to the specific mode in the prescribed area of the first notification panel, and
outputs the second notification panel including notification information of the application corresponding to one of the icons to the touch screen based on the drag touch, the drag touch starting from one of the icons and applied in the first direction.

7. The mobile terminal according to claim 5, wherein the first notification panel includes a specific area that displays notification information, and
when a drag touch is applied to the specific area in a second direction opposite the first direction, in a state in which notification information has been displayed in the specific area, the controller outputs the second notification panel to the touch screen.

8. The mobile terminal according to claim 7, wherein one or more notification information is displayed in the specific area and configured to be scrollable in the specific area, and
the drag touch applied to the specific area causes the second notification panel to be output when the one or more notification information in the specific area is scrolled to show the last notification information.

9. The mobile terminal according to claim 8, wherein
when the drag touch is applied with a first distance in the second direction in a state in which the one or more notification information is scrolled to show the last notification information, the controller outputs a graphic image in the specific area, indicating that a scroll using the drag touch on the specific area is not allowed, to the specific area,
when the drag touch is applied with a second distance longer than the first distance, the controller displays icons for applications having the notification mode set to the specific mode on the graphic image, and
when the drag touch is applied with a third distance longer than the second distance, the controller outputs the second notification panel including notification information of an application set to the specific mode to the touch screen.

10. The mobile terminal according to claim 1, wherein when a touch is applied to the prescribed area of the touch screen, a part of the first notification panel is displayed in the prescribed area of the touch screen,
when the applied touch is extended to include a predetermined pattern in a state in which the part of the first notification panel is displayed in the prescribed area of the touch screen, the part of the first notification panel displayed in the prescribed area of the touch screen is changed to a part of the second notification panel, and
when the applied touch is extended after the predetermined pattern to include the drag touch, the controller outputs the second notification panel to the touch screen.

11. The mobile terminal according to claim 1, wherein the controller outputs the second notification panel in place of the first notification panel when the first touch input is a drag input that starts from at least two points in the prescribed area of the touch screen.

12. The mobile terminal according to claim 1, wherein the controller is configured to
group a plurality of applications having the notification mode set to the specific mode into at least two groups based on user input,
display graphic objects related to the at least two groups when a touch is applied to the prescribed area of the first notification panel in a state in which the at least the two groups are set, and
display the second notification panel displaying notification information grouped according to selection of one of the graphic objects.

13. The mobile terminal according to claim 12, wherein the part of the first notification panel is displayed in the prescribed area of the touch screen when the first touch input is applied to the prescribed area of the touch screen, and
the controller changes the displayed part of the first notification panel into the graphic objects related to at least the two groups when a touch including a pattern is input to extend from the first touch input, and
the controller outputs the second notification panel displaying notification information of applications grouped according to selection of one of the graphic objects based on a drag touch that starts from one of the graphic objects.

14. The mobile terminal according to claim 12, wherein the controller outputs a third notification panel displaying notification information of applications for another group in response to a drag touch applied to the second notification panel.

15. The mobile terminal according to claim 14, wherein the drag touch for displaying the third notification panel is a drag touch that moves a notification information, the drag touch starting from a notification information displayed in the second notification panel and extending to one side of the second notification panel, and the controller displays the third notification panel including the dragged notification information when the drag touch is released at the third notification panel.

16. The mobile terminal according to claim 15, wherein when the dragged notification is moved to a second group, the controller sets the group for the application associated with the dragged notification information to be the second group.

17. The mobile terminal according to claim 1, wherein the controller changes a display of the first notification panel to the second notification panel when a drag touch that starts from notification information displayed in the first notification panel reaches one side of the first notification panel, and displays the notification information to which the drag touch is applied on the second notification panel when the drag touch is released at the second notification panel.

18. The mobile terminal according to claim 17, wherein the controller sets a notification mode of applications associated with notification information to which the drag touch is applied on the second notification panel to the specific mode.

19. A method for controlling a mobile terminal, the method comprising the steps of:
receiving, by a wireless communication unit, notification information for an application;
outputting on a touch screen, by a controller, at least a part of a first notification panel based on a drag touch input applied to a prescribed area of a touch screen; and
outputting on the touch screen, by a controller, at least a part of a second notification panel different from the first notification panel based on a touch applied to a prescribed area of the first notification panel in a state in which at least the part of the first notification panel has been output, wherein the first notification panel displays notifications for application having a first notification mode and the second notification panel displays notifications for applications having a second notification mode different from the first notification mode, and wherein when the notification mode for the application is set to the second notification mode, the notification information of the application is not displayed on the first notification panel and the second notification panel including the notification information of the application is displayed on the touch screen in response to the second touch input applied to the prescribed area of the first notification panel.

20. The method of claim 19, wherein the first notification mode is a normal mode and the second notification mode is a specific mode, wherein notifications for applications in the normal mode are displayed in the first notification panel, and wherein notification information for applications in the specific mode is displayed in the second notification panel and prevented from being displayed on the first notification panel.

* * * * *